US012811841B2

(12) United States Patent
Yang et al.

(10) Patent No.: US 12,811,841 B2
(45) Date of Patent: Nov. 24, 2026

(54) SCRAMBLING FOR PROBABILISTIC SHAPING

(71) Applicant: QUALCOMM Incorporated, San Diego, CA (US)

(72) Inventors: Wei Yang, San Diego, CA (US); Jing Jiang, San Diego, CA (US); Wei Liu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 174 days.

(21) Appl. No.: 18/835,318

(22) PCT Filed: Apr. 15, 2022

(86) PCT No.: PCT/CN2022/086988

§ 371 (c)(1),
(2) Date: Aug. 1, 2024

(87) PCT Pub. No.: WO2023/197282

PCT Pub. Date: Oct. 19, 2023

(65) Prior Publication Data

US 2025/0141728 A1 May 1, 2025

(51) Int. Cl.

| | |
|---|---|
| ***H04L 27/34*** | (2006.01) |
| ***H04L 1/00*** | (2006.01) |
| ***H04L 1/1812*** | (2023.01) |

(52) U.S. Cl.

CPC ........ *H04L 27/3405* (2013.01); *H04L 1/0042* (2013.01); *H04L 1/0047* (2013.01); *H04L 1/1819* (2013.01)

(58) Field of Classification Search

CPC . H04L 27/3405; H04L 1/0042; H04L 1/0047; H04L 1/1819

See application file for complete search history.

(56) References Cited

U.S. PATENT DOCUMENTS

| | | | | |
|---|---|---|---|---|
| 10,200,231 | B1 * | 2/2019 | Lefevre | H04L 27/3411 |
| 10,742,472 | B1 * | 8/2020 | Van Nee | H04L 1/0058 |
| 2002/0044073 | A1 | 4/2002 | Ungerboeck et al. | |
| 2014/0157086 | A1 | 6/2014 | Sharon et al. | |
| 2020/0162172 | A1 * | 5/2020 | Sridhar | H04L 27/12 |
| 2020/0266888 | A1 * | 8/2020 | Koganei | H04J 14/06 |
| 2021/0243058 | A1 * | 8/2021 | Doan | H04L 1/0042 |
| 2021/0336733 | A1 | 10/2021 | Yoshida | |
| 2021/0359784 | A1 * | 11/2021 | Iscan | H04L 1/0005 |
| 2023/0090492 | A1 * | 3/2023 | Ma | H04L 1/1819 714/726 |

FOREIGN PATENT DOCUMENTS

| | | | |
|---|---|---|---|
| WO | 2021045854 | | 3/2021 |
| WO | 2023097562 | A1 | 6/2023 |

OTHER PUBLICATIONS

International Search Report and Written Opinion—PCT/CN2022/086988—ISA/EPO—Nov. 25, 2022.

Supplementary European Search Report EP22936930 Search Authority Munich Nov. 19, 2025.

* cited by examiner

*Primary Examiner* — Freshteh N Aghdam

(74) *Attorney, Agent, or Firm* — Loza & Loza LLP

(57) ABSTRACT

Aspects relate to scrambling and probabilistic shaping of a signal. In some examples, scrambling may be applied to a signal and probabilistic shaping is applied to the scrambled signal. The resulting signal is then modulated and output for transmission (e.g., via a wireless communication resource or some other communication resource).

29 Claims, 21 Drawing Sheets

SCRAMBLING FOR PROBABILISTIC SHAPING

CROSS-REFERENCE TO RELATED APPLICATION

This application is the U.S. national stage of PCT patent application number PCT/CN2022/086988 filed on Apr. 15, 2022.

TECHNICAL FIELD

The technology discussed below relates generally to wireless communication and, more particularly, to scrambling techniques used in conjunction with probabilistic shaping.

INTRODUCTION

Next-generation wireless communication systems (e.g., 5G and 6G) may include a core network and a radio access network (RAN). A RAN supports communication via one or more cells. For example, a wireless communication device such as a user equipment (UE) may access a first cell of a first base station (BS) such as a gNB and/or access a second cell of a second base station.

A BS may schedule access to a cell to support access by multiple UEs. For example, a BS may allocate different resources (e.g., time domain and frequency domain resources) for different UEs operating within a cell of the BS. Thus, each UE may transmit information to the BS via one or more of these resources and/or the BS may transmit information to one or more of the UEs via one or more of these resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, an apparatus includes an interface and a processing system. The processing system may be configured to scramble a first signal to provide a second signal, apply probabilistic shaping to at least a portion of the second signal to provide non-uniform bits of a third signal, modulate the third signal to provide a fourth signal, and output the fourth signal via the interface for transmission.

In some examples, a method for communication at an apparatus is disclosed. The method may include scrambling a first signal to provide a second signal, applying probabilistic shaping to at least a portion of the second signal to provide non-uniform bits of a third signal, modulating the third signal to provide a fourth signal, and outputting the fourth signal for transmission.

In some examples, an apparatus may include means for scrambling a first signal to provide a second signal, means for applying probabilistic shaping to at least a portion of the second signal to provide non-uniform bits of a third signal, means for modulating the third signal to provide a fourth signal, and means for outputting the fourth signal for transmission.

In some examples, a non-transitory computer-readable medium has stored therein instructions executable by one or more processors of an apparatus to scramble a first signal to provide a second signal, apply probabilistic shaping to at least a portion of the second signal to provide non-uniform bits of a third signal, modulate the third signal to provide a fourth signal, and output the fourth signal for transmission.

In some examples, an apparatus includes an interface and a processing system. The processing system may be configured to obtain a first signal via the interface, demodulate the first signal to provide a second signal, apply probabilistic de-shaping to a portion of the second signal to provide a third signal, and descramble the third signal to provide a fourth signal.

In some examples, a method for communication at an apparatus is disclosed. The method may include obtaining a first signal, demodulating the first signal to provide a second signal, applying probabilistic de-shaping to a portion of the second signal to provide a third signal, and descrambling the third signal to provide a fourth signal.

In some examples, an apparatus may include means for obtaining a first signal, means for demodulating the first signal to provide a second signal, means for applying probabilistic de-shaping to a portion of the second signal to provide a third signal, and means for descrambling the third signal to provide a fourth signal.

In some examples, a non-transitory computer-readable medium has stored therein instructions executable by one or more processors of an apparatus to obtain a first signal, demodulate the first signal to provide a second signal, apply probabilistic de-shaping to a portion of the second signal to provide a third signal, and descramble the third signal to provide a fourth signal.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
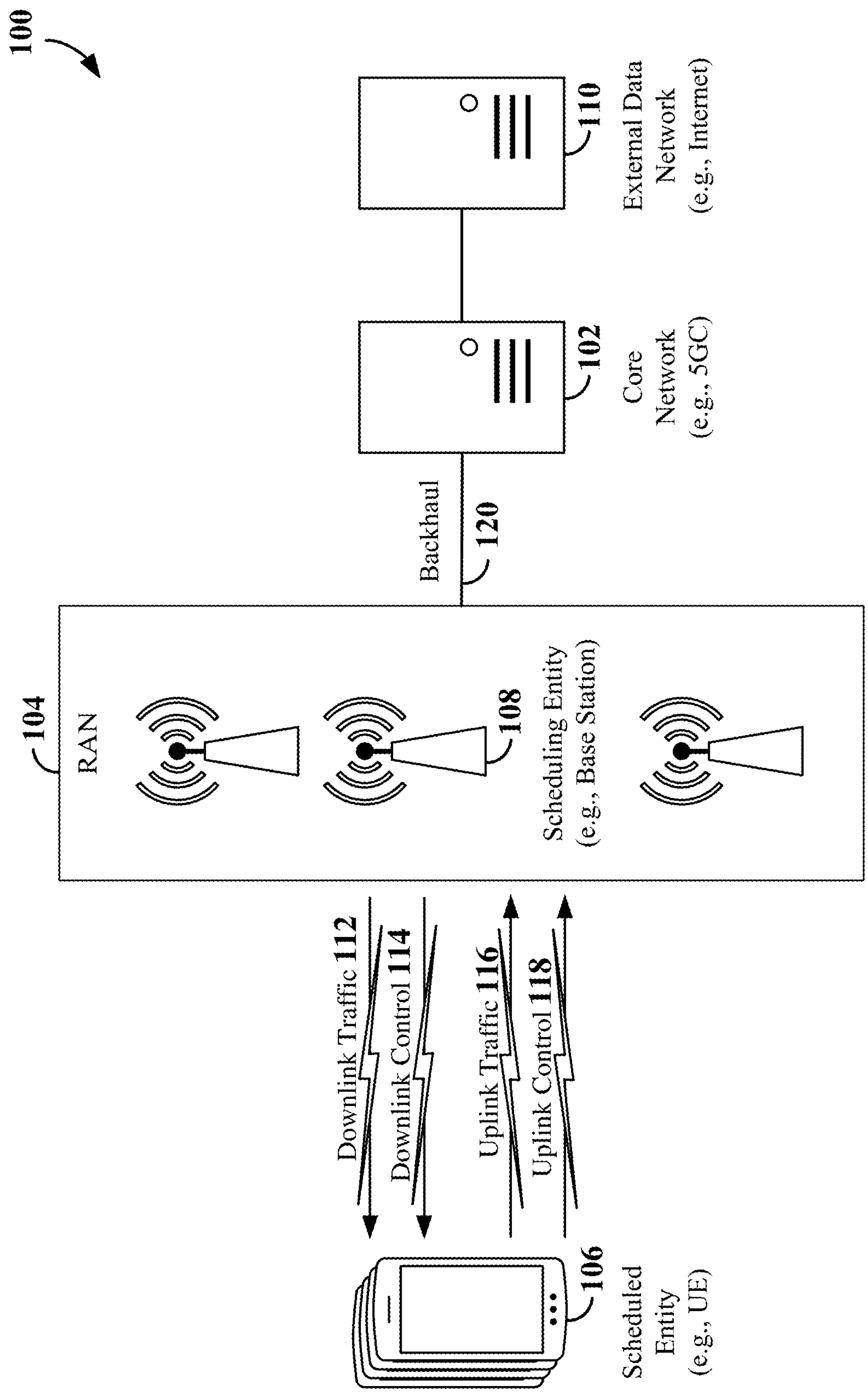
FIG. 1 is a schematic illustration of an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to scrambling a signal. In some aspects, encoded bits may be scrambled to provide a uniform modulation constellation such that different bits of the modulation constellation are generated with equal probability.

Various aspects of the disclosure relate to probabilistic shaping of a signal. In some aspects, probabilistic shaping may be used to increase the spectral efficiency of a modulated signal. For example, coded bits may be subject to probabilistic shaping such that in the resulting modulation constellation higher energy constellation points are transmitted less frequently than lower energy constellation points.

In some examples, scrambling may be applied to a signal prior to probability shaping of the signal. For example, scrambling may be applied to a signal and then probabilistic shaping is applied to the scrambled signal to provide a set of non-uniform bits. Channel coding (e.g., forward error correction) may then be applied to the set of non-uniform bits and a corresponding set of uniform bits. The resulting bits are then modulated and output for transmission (e.g., via a wireless communication resource or some other communication resource).

In some examples, scrambling may be applied to unshaped systematic bits and/or parity bits. For example, a channel coding (e.g., forward error correction) operation may generate shaped systematic bits (e.g., corresponding to non-uniform bits generated by probabilistic shaping), unshaped systematic bits, and parity bits. In this case, both the unshaped systematic bits and the parity bits may be scrambled or only the parity bits may be scrambled. The resulting bits are then modulated and output for transmission.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at a scheduled entity 106 (e.g., a user equipment (UE)). By virtue of the wireless communication system 100, the scheduled entity 106 may be enabled to carry out data communication with an external data network 110, such as (but not limited to) the Internet.

The RAN 104 may implement any suitable wireless communication technology or technologies to provide radio access to the scheduled entity 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of scheduling entities 108, which may be wireless nodes such as base stations. Broadly, a base station is a network element in a radio access network responsible for radio transmission and reception in one or more cells to or from a scheduled entity, such as a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations in the RAN 104 may be an LTE base station, while another base station in the RAN 104 may be a 5G NR base station.

The radio access network 104 is further illustrated supporting wireless communication for multiple scheduled entities 106, which may be wireless nodes such as mobile apparatuses. A mobile apparatus may be referred to as a user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A scheduled entity 106 may be an apparatus that provides a user with access to network services. In examples where the RAN 104 operates according to both the LTE and 5G NR standards, the scheduled entity 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. Mobile apparatuses such as UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a scheduled entity 106 may be described as utilizing an air interface. For example, transmissions over the air interface from a base station (e.g., the scheduling entity 108) to one or more UEs (e.g., the scheduled entity 106) may be referred to as downlink (DL) transmission. In some examples, the term downlink may refer to a point-to-multipoint transmission originating at a base station (e.g., the scheduling entity 108). Another way to describe this point-to-multipoint transmission scheme may be to use the term broadcast channel multiplexing. Transmissions from a UE (e.g., the scheduled entity 106) to a base station (e.g., the scheduling entity 108) may be referred to as uplink (UL) transmissions. In some examples, the term uplink may refer to a point-to-point transmission originating at a UE (e.g., the scheduled entity 106).

In some examples, access to the air interface may be scheduled, whereby a scheduling entity 108 (e.g., a base station) allocates resources for communication among some or all devices and equipment within its service area or cell. Within the present disclosure, as discussed further below, the scheduling entity 108 may be responsible for scheduling, assigning, reconfiguring, and releasing resources for one or more scheduled entities 106 (e.g., UEs). That is, for scheduled communication, a plurality of scheduled entities 106, which may be UEs, may utilize resources allocated by a scheduling entity 108 (e.g., a base station).

Base stations are not the only entities that may function as scheduling entities. In some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 (e.g., a base station) may broadcast downlink traffic 112 to one or more scheduled entities 106 (e.g., one or more UEs). In some examples, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. In some examples, the scheduled entity 106 is a node or device that receives downlink control information 114, including but not limited to scheduling information (e.g., a grant), synchronization or timing information, or other control information from another entity in the wireless communication system 100 such as the scheduling entity 108.

The uplink control information 118, the downlink control information 114, the downlink traffic 112, and/or the uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, scheduling entities 108 such as base stations may include a backhaul interface for communication with a backhaul 120 of the wireless communication system. The backhaul 120 may provide a link between a scheduling entity 108 and the core network 102. Further, in some examples, a backhaul network may provide interconnection between the respective scheduling entities 108 (e.g., base stations). Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
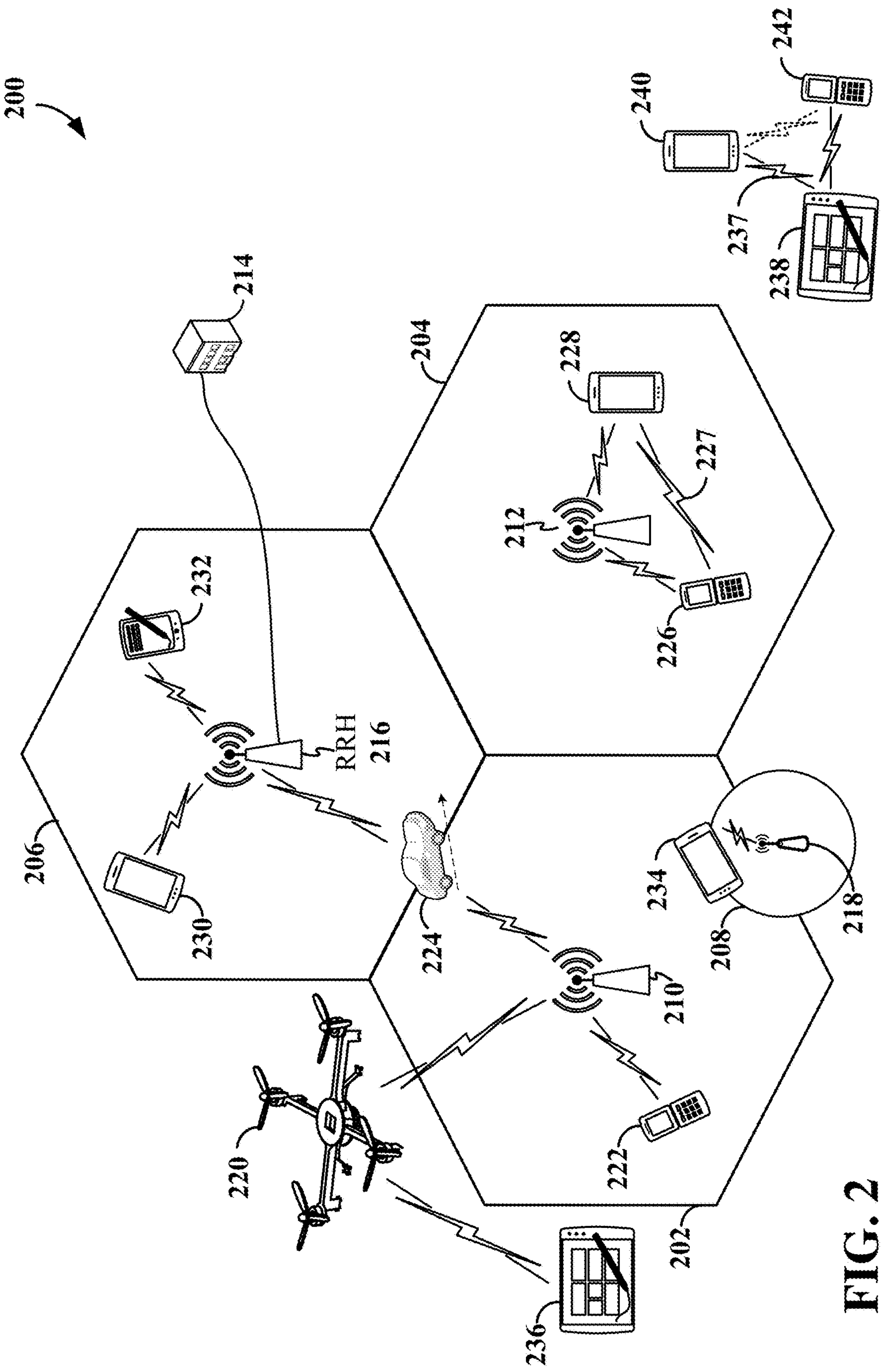
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1. For purposes of illustration, the RAN 104 is described as including wireless nodes such as UEs, base stations, access points, and so on. It should be appreciated that the corresponding discussion that follows may also apply more generally to scheduling entities and scheduled entities.

The geographic area covered by the RAN 200 may be divided into cellular regions (cells) that can be uniquely identified by a UE based on an identification broadcasted from an access point or a base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a relatively large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, UEs may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within the cell 202 by communicating with the base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242)

may communicate with each other using sidelink signals 237 without relaying that communication through a base station. In some examples, the UEs 238, 240, and 242 may each function as a scheduling entity or a transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., the base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., the UE 224) may be concurrently received by two or more cells (e.g., the base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from the UEs 222 and 224 to the base station 210, and for multiplexing for DL transmissions from the base station 210 to one or more of the UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to the UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
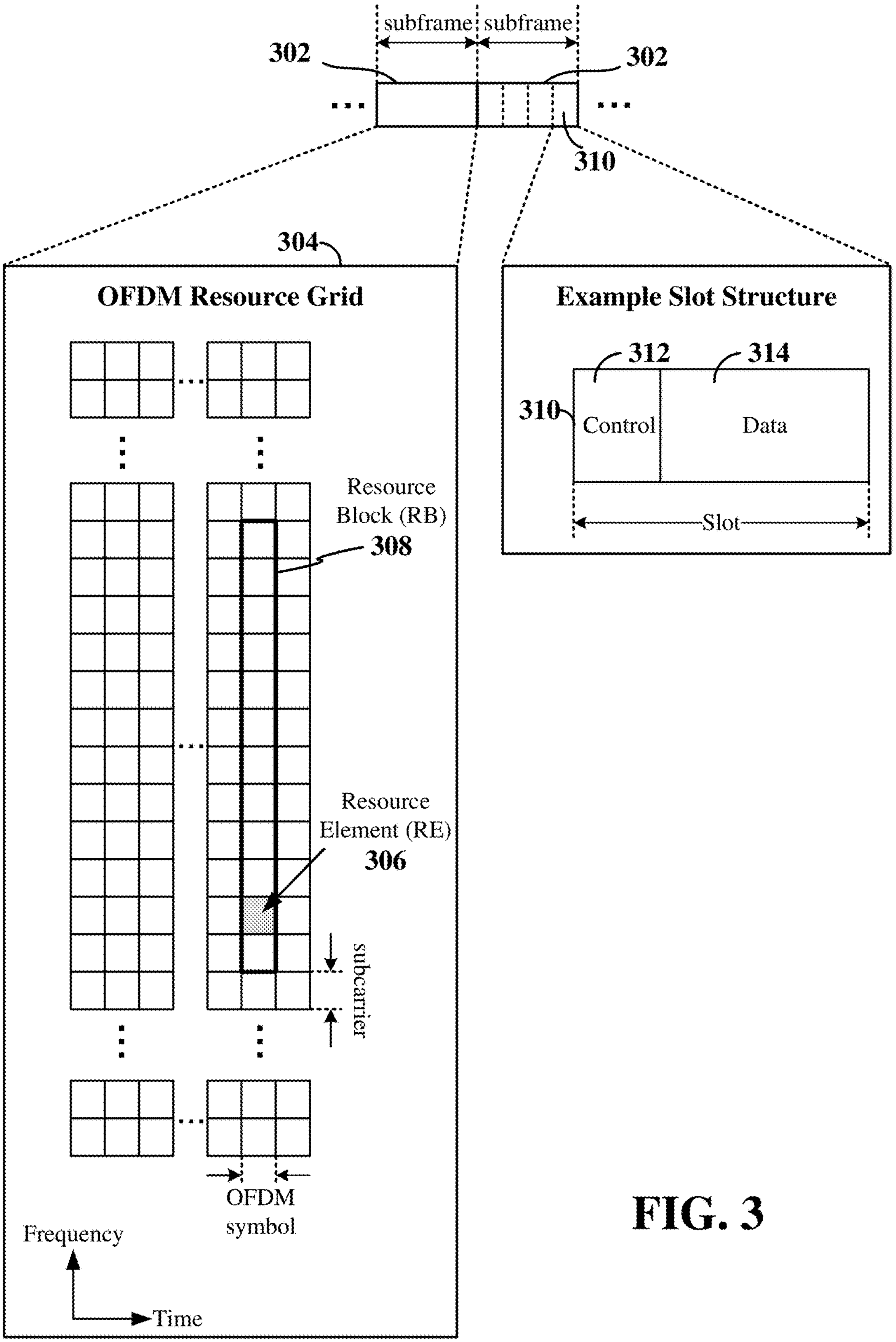
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting)

sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
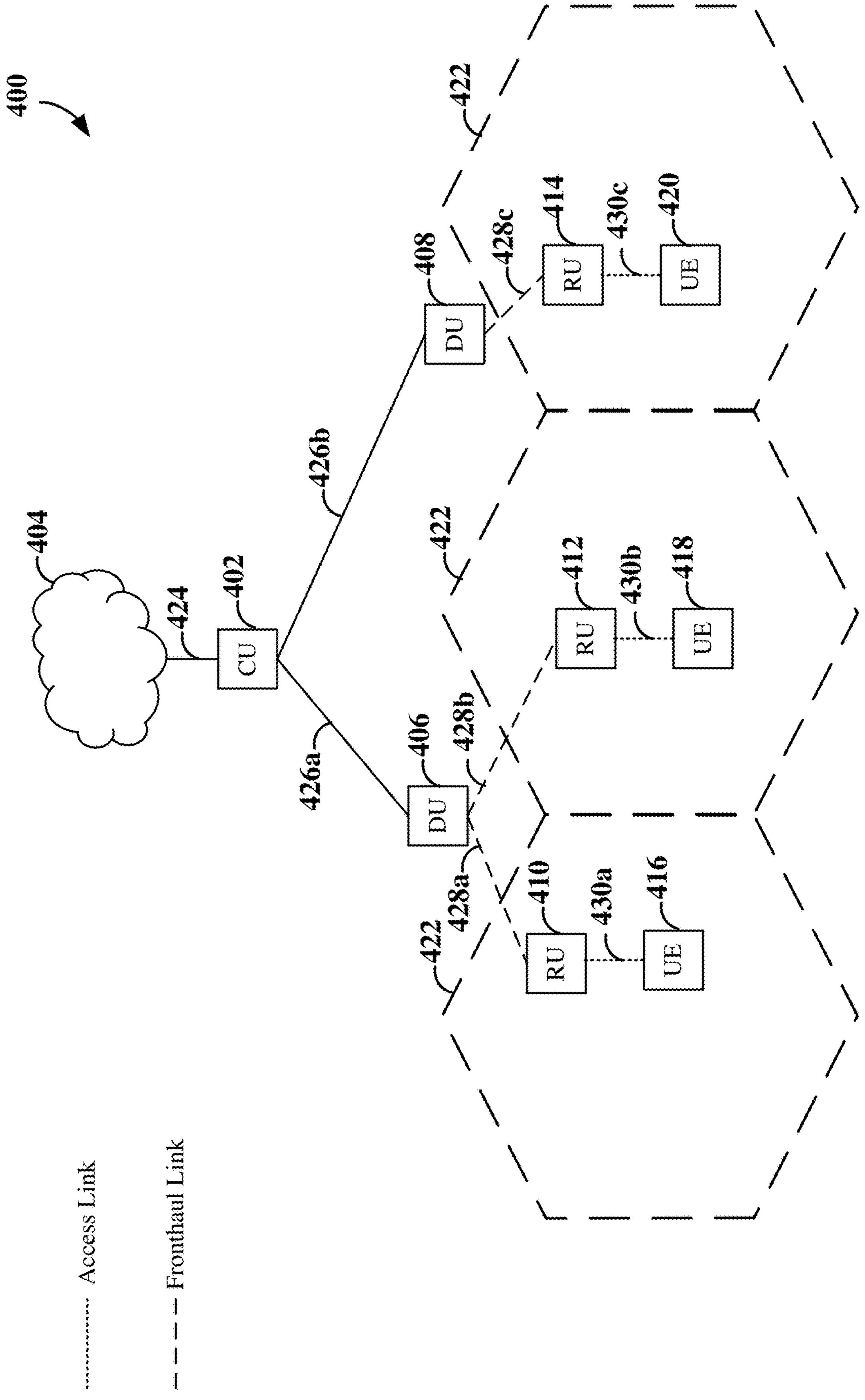
FIG. 4 is a conceptual illustration of an example of distributed entities in a wireless communication network according to some aspects.

FIG. 4 is a diagram illustrating an example of a RAN 400 including distributed wireless nodes (e.g., wireless communication devices or entities) according to some aspects. The RAN 400 may be similar to the RAN 200 shown in FIG. 2, in that the RAN 400 may be divided into a number of cells (e.g., cells 422) each of which may be served by respective network nodes (e.g., control units, distributed units, and radio units). The network nodes may constitute access points, base stations (BSs), eNBs, gNBs, or other nodes that utilize wireless spectrum (e.g., the radio frequency (RF) spectrum) and/or other communication links to support access for one or more UEs located within the cells.

In the example of FIG. 4, a control unit (CU) 402 communicates with a core network 404 via a backhaul link 424, and communicates with a first distributed unit (DU) 406 and a second distributed unit 408 via respective midhaul links 426*a* and 426*b*. The first distributed unit 406 communicates with a first radio unit (RU) 410 and a second radio unit 412 via respective fronthaul links 428*a* and 428*b*. The second distributed unit 408 communicates with a third radio unit 414 via a fronthaul link 428*c*. The first radio unit 410 communicates with at least one UE 416 via at least one RF access link 430*a*. The second radio unit 412 communicates with at least one UE 418 via at least one RF access link 430*b*. The third radio unit 414 communicates with at least one UE 420 via at least one RF access link 430*c*.

In some examples, a control unit (e.g., the CU 402) is a logical node that hosts a packet data convergence protocol (PDCP) layer, a radio resource control (RRC) layer, a service data adaptation protocol (SDAP) layer and other control functions. A control unit may also terminate interfaces (e.g., an E1 interface, an E2 interface, etc., not shown in FIG. 4) to network nodes (e.g., nodes of a core network). In addition, an F1 interface (not shown in FIG. 4) may provide a mechanism to interconnect a control unit (e.g., the PDCP layer and higher layers) and a distributed unit (e.g., the radio link control (RLC) layer and lower layers). In some aspects, an F1 interface may provide control plane and user plane functions (e.g., interface management, system information management, UE context management, RRC message transfer, etc.). For example, the F1 interface may support F1-C on the control plane and F1-U on the user plane. F1AP is an application protocol for F1 that defines signaling procedures for F1 in some examples.

In some examples, a distributed unit (e.g., the DU 406 or the DU 408) is a logical node that hosts an RLC layer, a medium access control (MAC) layer, and a high physical (PHY) layer based on a lower layer functional split (LLS). In some aspects, a distributed unit may control the operation of at least one radio unit. A distributed unit may also terminate interfaces (e.g., F1, E2, etc.) to the control unit and/or other network nodes. In some examples, a high PHY layer includes portions of the PHY processing such as forward error correction 1 (FEC 1) encoding and decoding, scrambling, modulation, and demodulation.

In some examples, a radio unit (e.g., the RU 410, the RU 412, or the RU 414) is a logical node that hosts low PHY layer and radio frequency (RF) processing based on a lower layer functional split. In some examples, a radio unit may be similar to a 3GPP transmit receive point (TRP) or remote radio head (RRH), while also including the low PHY layer. In some examples, a low PHY layer includes portions of the PHY processing such as fast Fourier transform (FFT), inverse FFT (iFFT), digital beamforming, and physical random access channel (PRACH) extraction and filtering. The radio unit may also include a radio chain for communicating with one or more UEs.

Figure 5:
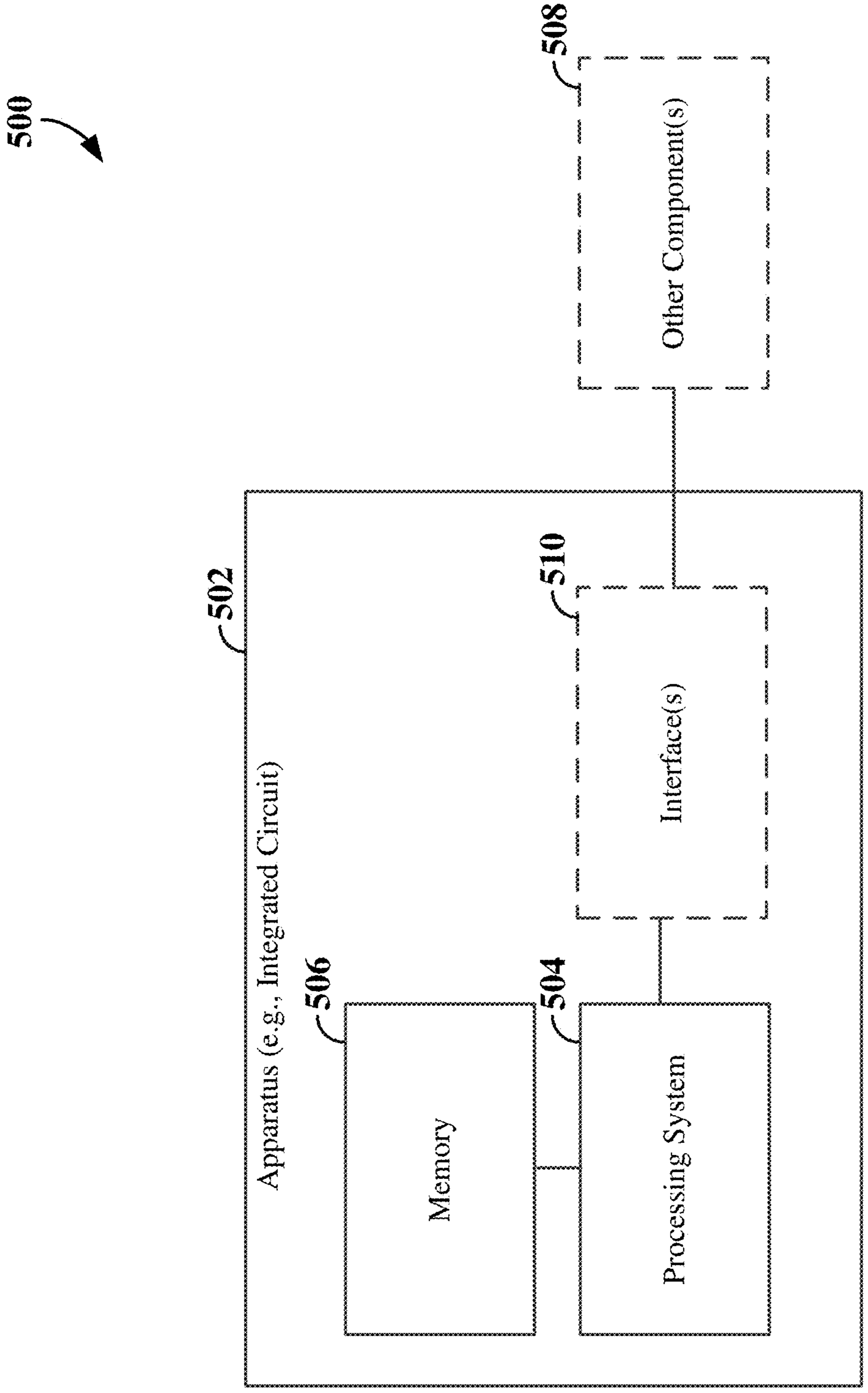
FIG. 5 is a schematic illustration of an example of an apparatus for communication according to some aspects.

FIG. 5 illustrates an example apparatus 500 according to certain aspects of the disclosure. In some examples, the apparatus 500 may be a BS, a UE, or some other type of wireless node (e.g., a node that utilizes wireless spectrum (e.g., the RF spectrum) to communicate with another node or entity). In some examples, the apparatus 500 may correspond to any of the apparatuses, UEs, scheduled entities, base stations (e.g., gNBs), scheduling entities, distributed units, control units, RAN nodes, or CN entities shown in any of FIGS. 1, 2, 4, 18, and 20. In some examples, the apparatus 500 may include any of the transmit chains and/or receive chains shown in any of FIGS. 6-9, 12-15, and 17.

The apparatus 500 includes an apparatus 502 (e.g., an integrated circuit) and, optionally, at least one other component 508. In some aspects, the apparatus 502 may be configured to operate in a wireless communication device (e.g., a UE, a BS, etc.) and to perform one or more of the operations described herein. The apparatus 502 includes a processing system 504, and a memory 506 coupled to the processing system 504. Example implementations of the processing system 504 are provided herein. In some examples, the processing system 504 of FIG. 5 may correspond to the processing system 1814 of FIG. 18. In some examples, the processing system 504 of FIG. 5 may correspond to the processing system 2014 of FIG. 20.

The processing system 504 is generally adapted for processing, including the execution of such programming stored on the memory 506. For example, the memory 506 may store instructions that, when executed by the processing system 504, cause the processing system 504 to perform one or more of the operations described herein.

In some implementations, the apparatus 502 communicates with at least one other component (e.g., a component 508 external to the apparatus 502) of the apparatus 500. To this end, in some implementations, the apparatus 502 may include at least one interface 510 (e.g., a send and/or receive interface) coupled to the processing system 504 for outputting and/or obtaining (e.g., sending and/or receiving) information (e.g., received information, generated information, decoded information, messages, etc.) between the processing system 504 and the other component(s) 508. In some implementations, the interface 510 may include an interface bus, bus drivers, bus receivers, buffers, other suitable circuitry, or a combination thereof. In some implementations, the interface 510 may include radio frequency (RF) circuitry (e.g., an RF transmitter and/or an RF receiver). In some implementations, the interface 510 may be configured to interface the apparatus 502 to one or more other components of the apparatus 500 (other components not shown in FIG. 5). For example, the interface 510 may be configured to interface the processing system 504 to a radio frequency (RF) front end (e.g., an RF transmitter and/or an RF receiver).

The apparatus 502 may communicate with other apparatuses in various ways. In cases where the apparatus 502 includes an RF transceiver (not shown in FIG. 5), the apparatus may transmit and receive information (e.g., a frame, a message, bits, etc.) via RF signaling. In some cases, rather than transmitting information via RF signaling, the apparatus 502 may have an interface to provide (e.g., output, send, transmit, etc.) information for RF transmission. For example, the processing system 504 may output information, via a bus interface, to an RF front end for RF transmission. Similarly, rather than receiving information via RF signaling, the apparatus 502 may have an interface to obtain information that is received by another apparatus. For example, the processing system 504 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Figure 6:
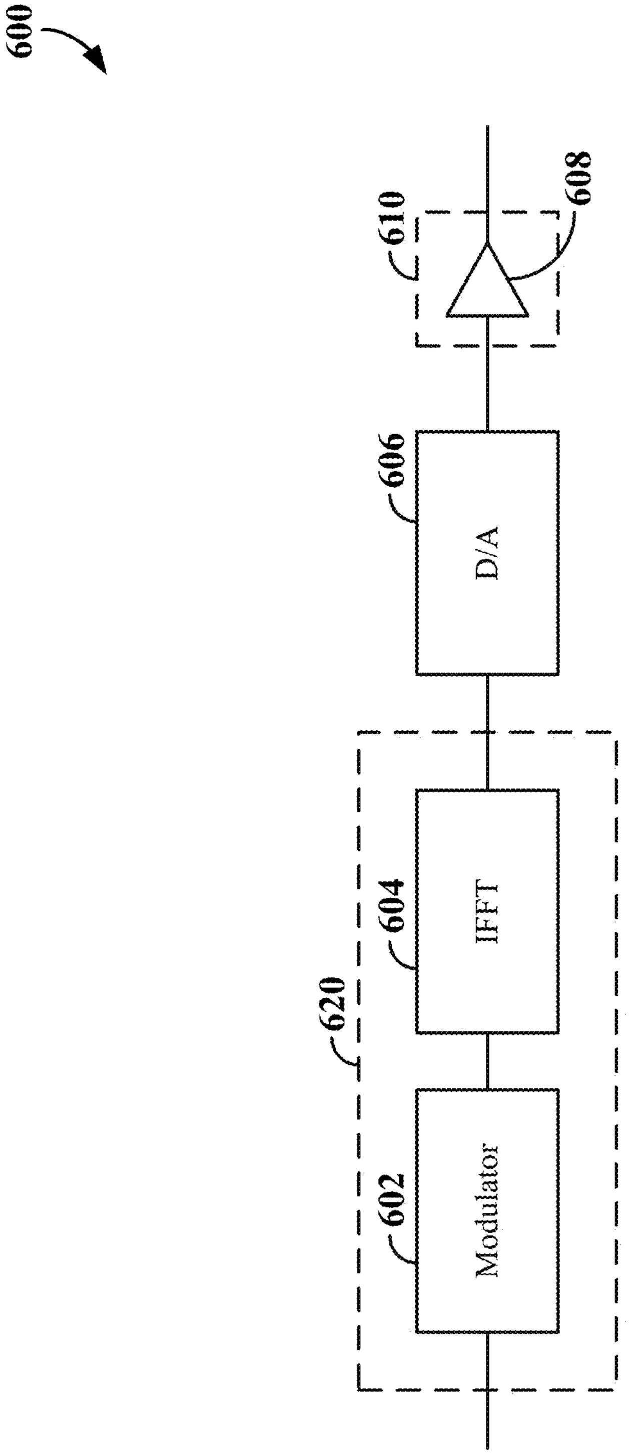
FIG. 6 is a schematic illustration of an example of a transmit chain according to some aspects.
Figure 7:
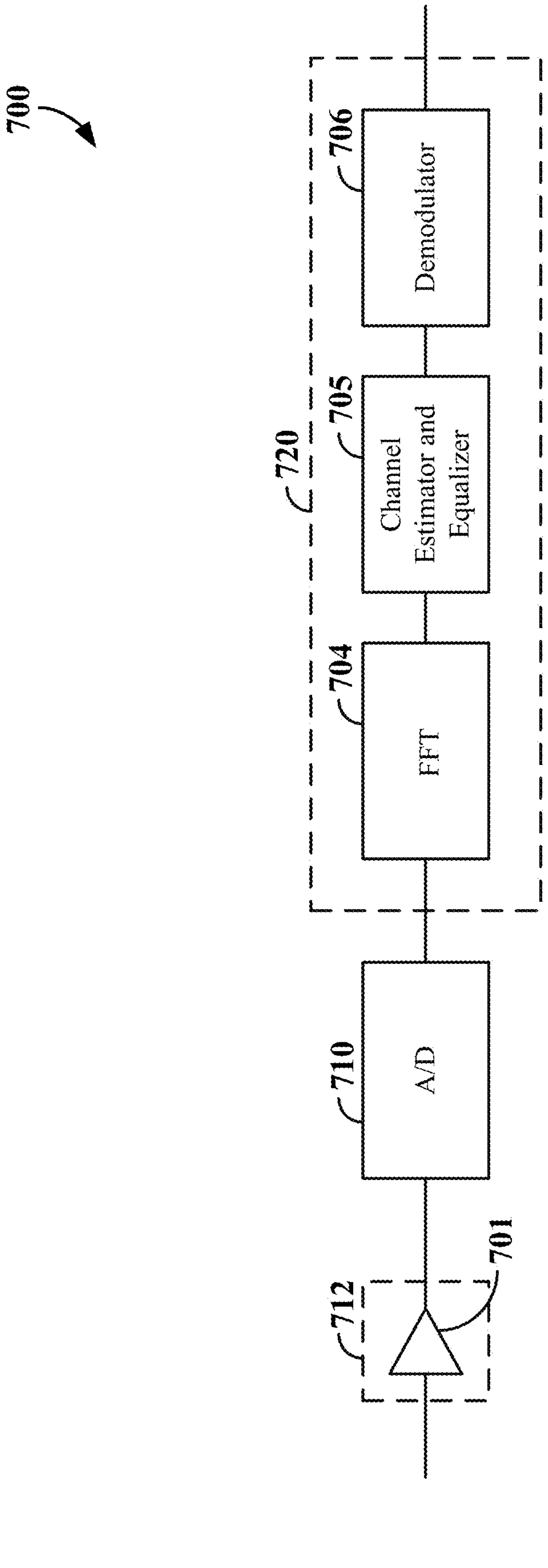
FIG. 7 is a schematic illustration of an example of a receive chain according to some aspects.

As discussed above, a wireless communication device may perform various processing (e.g., encoding, modulation, etc.) operations in conjunction with transmitting a transmission. In addition, a wireless communication device may perform various processing (e.g., decoding, demodulation, etc.) operations in conjunction with receiving a transmission. FIGS. 6 and 7 illustrate example components of a wireless communication device that may be used for such transmit operations and receive operations, respectively.

FIG. 6 illustrates various components that may be utilized in a transmit chain 600 to transmit a wireless transmission. The components illustrated in FIG. 6 may be used, for example, to transmit OFDM signals. In some examples, the transmit chain 600 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

The transmit chain 600 of FIG. 6 may include a modulator 602 configured to modulate bits for transmission. For example, the modulator 602 may determine a plurality of symbols from bits received from a processing system (not shown)), for example by mapping bits to a plurality of symbols according to a constellation. The bits may correspond to user data or to control information. In some aspects, the bits are received in codewords. In one aspect, the modulator 602 may include a QAM (quadrature amplitude modulation) modulator (e.g., a 16-QAM modulator, a 64-QAM modulator, etc.). In other aspects, the modulator 602 may include a binary phase-shift keying (BPSK) modulator, a quadrature phase-shift keying (QPSK) modulator, or an 8-PSK modulator.

The transmit chain 600 may further include a transform module 604 (e.g., a transform circuit) configured to convert symbols or otherwise modulated bits from the modulator 602 into a time domain. In FIG. 6, the transform module 604 is illustrated as being implemented by an inverse fast Fourier transform (IFFT) module. In some implementations, there may be multiple transform modules (not shown) that transform units of data of different sizes. In some implementations, the transform module 604 may be itself configured to transform units of data of different sizes. For example, the transform module 604 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 604 may be referred to as the size of the transform module 604.

In FIG. 6, the modulator 602 and the transform module 604 are illustrated as being implemented in the digital signal processor (DSP) 620. In some aspects, however, one or both of the modulator 602 and the transform module 604 are implemented in a processing system (e.g., the processing system 504 of FIG. 5) or in another element of the transmit chain 600.

The transmit chain 600 may further include a digital-to-analog (D/A) converter 606 configured to convert the output of the transform module into an analog signal. For example, the time-domain output of the transform module 604 may be converted to a baseband OFDM signal by the digital to analog converter 606. The digital to analog converter 606 may be implemented in the processing system or in another element of the transmit chain 600. In some aspects, the digital to analog converter 606 is implemented in a transceiver or in a data transmit processor (not shown).

The analog signal may be wirelessly transmitted by the transmitter 610. The analog signal may be further processed before being transmitted by the transmitter 610, for example by being filtered or by being upconverted to an intermediate or carrier frequency. In the aspect illustrated in FIG. 6, the transmitter 610 includes a transmit amplifier 608. Prior to being transmitted, the analog signal may be amplified by the transmit amplifier 608. In some aspects, the amplifier 608 may include a low noise amplifier (LNA).

FIG. 7 illustrates various components that may be utilized in an receive chain 700 to receive a wireless transmission. The components illustrated in FIG. 7 may be used, for example, to receive OFDM signals. For example, the components illustrated in FIG. 7 may be used to receive a wireless signal transmitted by the components discussed above with respect to FIG. 6. In some examples, the receive chain 700 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

In the example of FIG. 7, the receiver 712 includes a receive amplifier 701. The receive amplifier 701 may be configured to amplify the wireless signal received by the receiver 712. In some aspects, the receiver 712 is configured to adjust the gain of the receive amplifier 701 using an automatic gain control (AGC) procedure. In some aspects, the amplifier 701 may include an LNA.

The receive chain 700 may include an analog to digital converter 710 configured to convert the amplified wireless signal from the receiver 712 into a digital representation thereof. Further to being amplified, the wireless signal may be processed before being converted by the analog to digital converter 710, for example by being filtered or by being down-converted to an intermediate or baseband frequency. The analog to digital converter 710 may be implemented in a processing system (e.g., the processing system 504 of FIG. 5) or in another element of the receive chain 700. In some aspects, the analog to digital converter 710 is implemented in a transceiver or in a data receive processor (not shown).

The receive chain 700 may further include a transform module 704 configured to convert the representation of the wireless signal into a frequency spectrum. In FIG. 7, the transform module 704 is illustrated as being implemented by a fast Fourier transform (FFT) module. In some aspects, the transform module 704 may identify a symbol for each point that it uses. Similar to the transform module 604 described above with reference to FIG. 6, the transform module 704 may be configured with a plurality of modes, and may use a different number of points to convert the signal in each mode. The number of points used by the transform module 704 may be referred to as the size of the transform module 704. In some aspects, the transform module 704 may identify a symbol for each point that it uses.

The receive chain 700 may further include a channel estimator and equalizer 705 configured to form an estimate of the channel over which the data unit is received, and to remove certain effects of the channel based on the channel estimate. For example, the channel estimator and equalizer 705 may be configured to approximate a function of the channel, and the channel equalizer may be configured to apply an inverse of that function to the data in the frequency spectrum.

The receive chain 700 may further include a demodulator 706 configured to demodulate the equalized data. For example, the demodulator 706 may determine a plurality of bits from symbols output by the transform module 704 and the channel estimator and equalizer 705, for example by reversing a mapping of bits to a symbol in a constellation. The bits may be processed or evaluated by the processing system, or used to display or otherwise output information. In this way, data and/or information may be decoded. In some aspects, the bits correspond to codewords. In one aspect, the demodulator 706 may include a QAM (quadrature amplitude modulation) demodulator (e.g., a 16 QAM demodulator, a 64-QAM demodulator, etc.). In other aspects, the demodulator 706 may include a binary phase-shift keying (BPSK) demodulator or a quadrature phase-shift keying (QPSK) demodulator.

In FIG. 7, the transform module 704, the channel estimator and equalizer 705, and the demodulator 706 are illustrated as being implemented in the DSP 720. In some aspects, however, one or more of the transform module 704, the channel estimator and equalizer 705, and the demodulator 706 are implemented in a processing system or in another element of the receive chain 700.

In some wireless communication systems (e.g., cellular, Wi-Fi, etc.), a higher-order modulation (e.g., 16 QAM, 64 QAM, 256 QAM, etc.) may be used to increase the spectral efficiency of wireless communication, particularly at higher signal-to-noise ratio (SNR) values. In these systems, the modulation constellations are generally fixed (typically square constellations), and each constellation point is used with equal probability.

Since the bit stream after channel encoding might not be uniformly distributed, a scrambling technique may be used to scramble the coded bits generated by the encoder with uniform random bits. Thus, the output of the scrambler may consist of uniformly distributed bits (e.g., bits that are uniformly distributed over the binary set {0,1}). In some aspects, uniformly distributed bits implies that the modulation symbols generated by the modulation operation are uniformly distributed over the constellation set.

Figure 8:
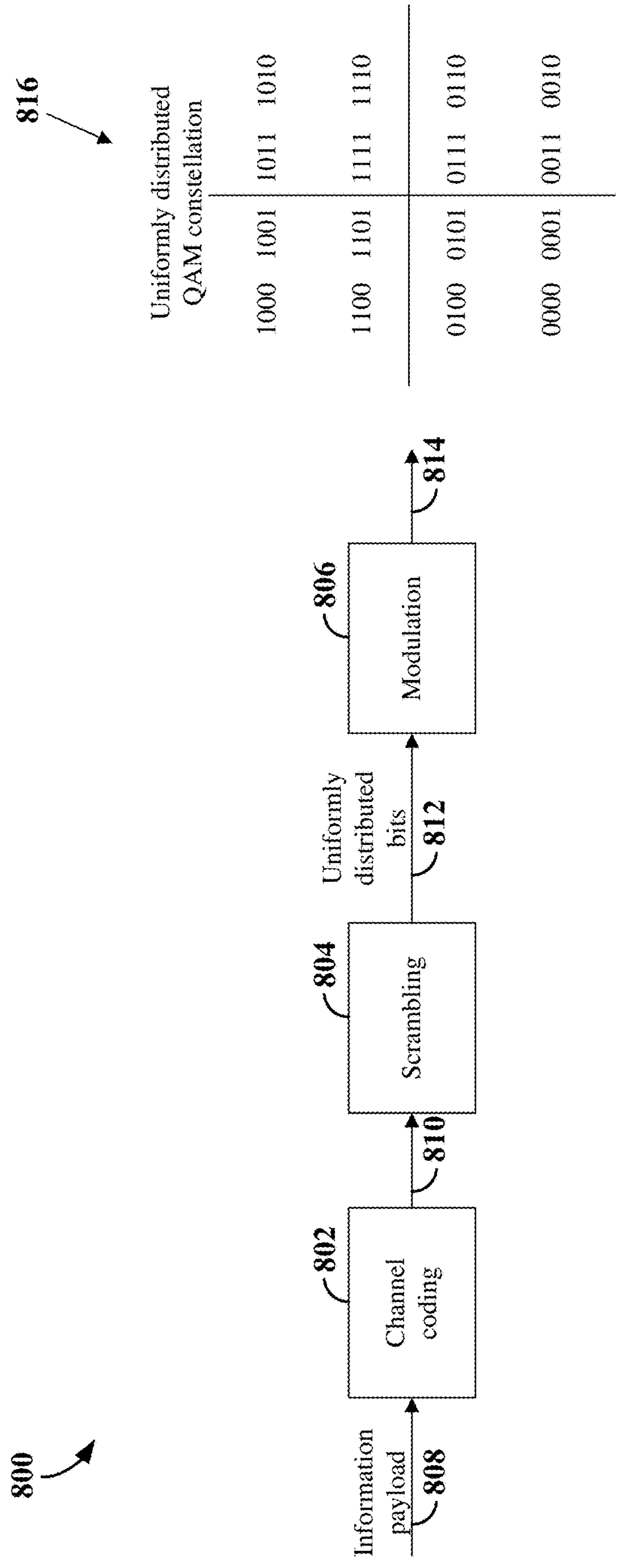
FIG. 8 is a schematic illustration of an example of scrambling in a transmit chain according to some aspects.

FIG. 8 illustrates an example of a transmit chain 800 that includes channel coding 802 (e.g., a channel coder), scrambling 804 (e.g., a scrambler), and modulation 806 (e.g., a modulator). In some examples, the transmit chain 800 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

The channel coding 802 is applied to an information payload 808 to provide a set of encoded bits 810. In some aspects, the channel coding 802 may apply redundancy to the information payload 808 to enable a receiving device to recover a transmitted signal more effectively. The scrambling 804 is applied to the encoded bits 810 to provide a set of uniformly distributed bits 812. The modulation 806 (QAM modulation in this example) is applied to the uniformly distributed bits 812 to provide an output signal 814 that corresponds to a uniformly distributed QAM constellation 816.

Scrambling has multiple purposes. In some aspects, scrambling may make the output after encoding Bern (0.5) distributed (i.e., equiprobably over {0,1}). Hence the output after modulation is uniformly distributed over the set of QAM constellations. This helps to ensure that the average power of the transmitted signal corresponds to the desired transmit power. In contrast, if the output after modulation is not uniformly distributed over the set of QAM constellations, the transmit power may fluctuate due to the transient nature of the transmit power for the different constellation points.

In some aspects, scrambling may result in inter-cell interference and/or intra-cell interference being as random as possible. In contrast, if the interference is not random (e.g., the interference has bias), this may reduce the performance at the receiver since receivers and/or detectors are typically designed with the assumption that interference has a zero-mean statistically.

In some aspects, scrambling may be used to differentiate different users. For example, different scrambling sequences may be assigned to different UEs. Thus, based on the scrambling sequence of a received uplink signal, a base station and/or receiver may determine which UE sent the uplink signal.

Some wireless communication systems may employ probabilistic shaping. Probabilistic shaping may be used to generate non-uniformly distributed coded modulation symbols, such that some constellation points (e.g., lower energy constellation points) are transmitted more frequently than other constellation points (e.g., higher energy constellation points) in contrast with the uniformly distributed constellation discussed above. In some aspects, it may be desirable to use non-uniformly distributed coded modulation symbols to improve the spectral efficiency of the coded modulation.

In some aspects, one goal of probabilistic shaping is to generate non-uniformly distributed constellations that can result in a larger mutual information I (X;Y) between an input signal X and an output signal Y than uniformly distributed constellations at the same SNR. In other words, by using non-uniformly distributed constellations, a transmitter may be able to transmit more information at a given transmit power than the transmitter could transmit using uniformly distributed constellations. An example of a probabilistic shaping technique is probabilistic amplitude shaping (PAS), which shapes the amplitude of the constellation, but leaves the sign of the constellation uniformly distributed. In some aspects, probabilistic shaping is akin to distribution matching (DM). For example, a probabilistic shaper may employ a distributed matcher that maps a uniform bit sequence to a bit sequence with a desired distribution (e.g., a Gaussian distribution).

Figure 9:
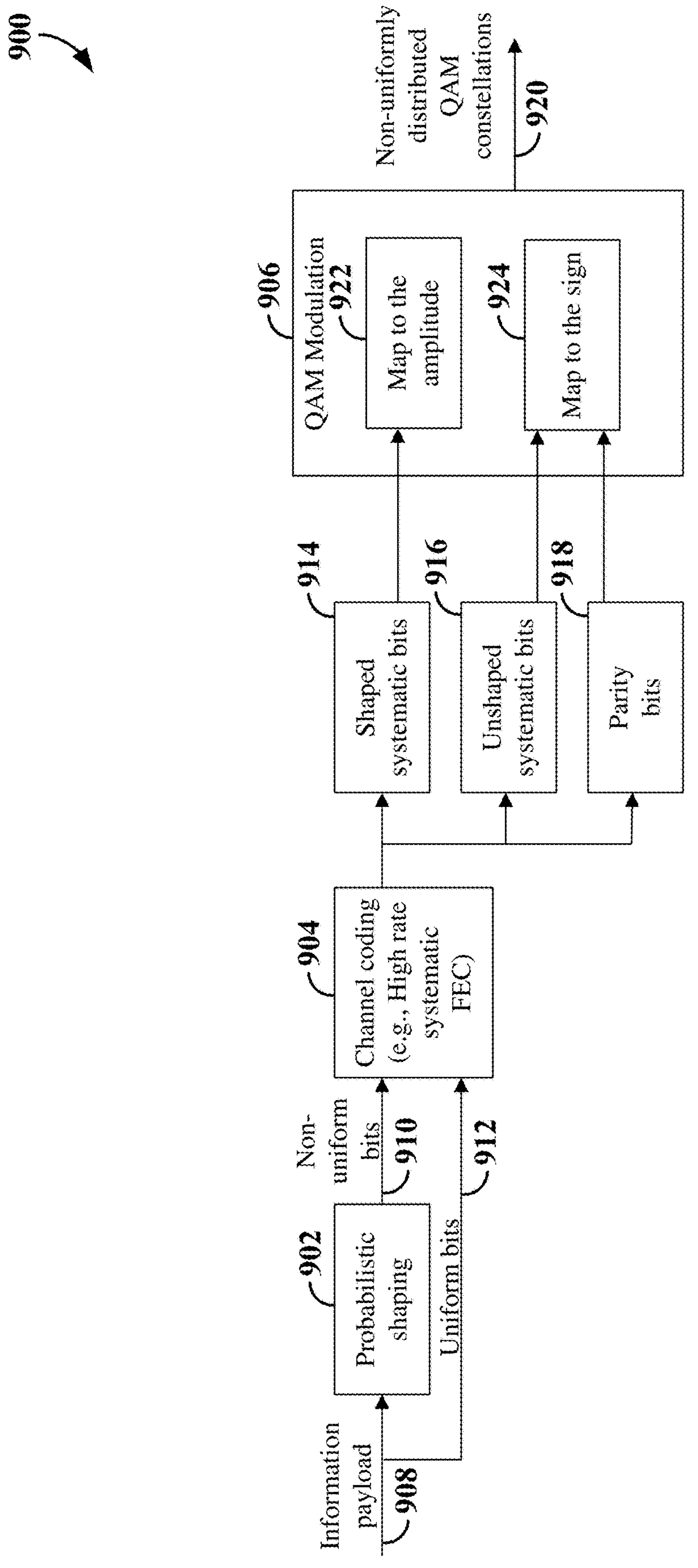
FIG. 9 is a schematic illustration of an example of probabilistic shaping in a transmit chain according to some aspects.

FIG. 9 illustrates an example of a transmit chain 900 that includes probabilistic shaping 902 (e.g., a probabilistic shaper), along with channel coding 904 (e.g., an encoder), and QAM modulation 906 (e.g., a modulator). In some examples, the channel coding 904 may include forward error correction (FEC). In some examples, the transmit chain 900 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

An information payload 908 is split into a first set of bits that are provided to the probabilistic shaping 902 and a second set of bits (a set of uniform bits 912). In some examples, this split is performed in a manner to ensure that after the channel coding 904, half of the bits are shaped bits (e.g., are indicative of an amplitude of a constellation point) and the other half of the bits are unshaped bits (e.g., are indicative of a sign of a constellation point). The probabilistic shaping 902 applies probabilistic shaping to the first set of bits of the information payload 908. The channel coding 904 operates on a set of non-uniform bits 910 output by the probabilistic shaping 902 and a corresponding set of uniform bits 912. The output of the channel coding 904, including shaped systematic bits 914 (e.g., corresponding to the non-uniform bits 910), unshaped systematic bits 916 (e.g., corresponding to the uniform bits 912), and parity bits 918, are modulated by the QAM modulation 906 to generate non-uniformly distributed QAM constellations 920. Here, the channel coding 904 may directly pass the non-uniform bits 910 to provide the shaped systematic bits 914. Thus, the shaped systematic bits 914 will have the same distribution as the non-uniform bits 910 in this case. Similarly, the channel coding 904 may directly pass the uniform bits 912 to provide the unshaped systematic bits 916. Thus, the unshaped systematic bits 916 may have the same distribution as the uniform bits 912. The parity bits generated by the channel coding 904 are uniformly distributed. As used herein, the term non-uniform bits refers to a set of bits in which the number of bits that are set to a value of zero (0) is not equal to the number of bits that are set to a value of one (1); or equivalently, a set of bits in which the bit is not equiprobable on {0,1}. Conversely, the term uniform bits refers to a set of bits in which the number of bits that are set to a value of zero (0) is equal to the number of bits that are set to a value of one (1); or equivalently, a set of bits in which the bit is equiprobable on {0,1}. In some examples, this uniformity may apply statistically over multiple transmissions (e.g., the bits of a single transmission might not be perfectly uniform).

In various examples, the output of the channel coding 904 may be mapped to the QAM constellation in different ways. FIG. 9 illustrates an example where the shaped systematic bits 1214 are mapped 922 to the amplitudes of the QAM constellation points, while the unshaped systematic bits 916 and the parity bits 918 are mapped 924 to the signs of the QAM constellation points.

Figure 10:
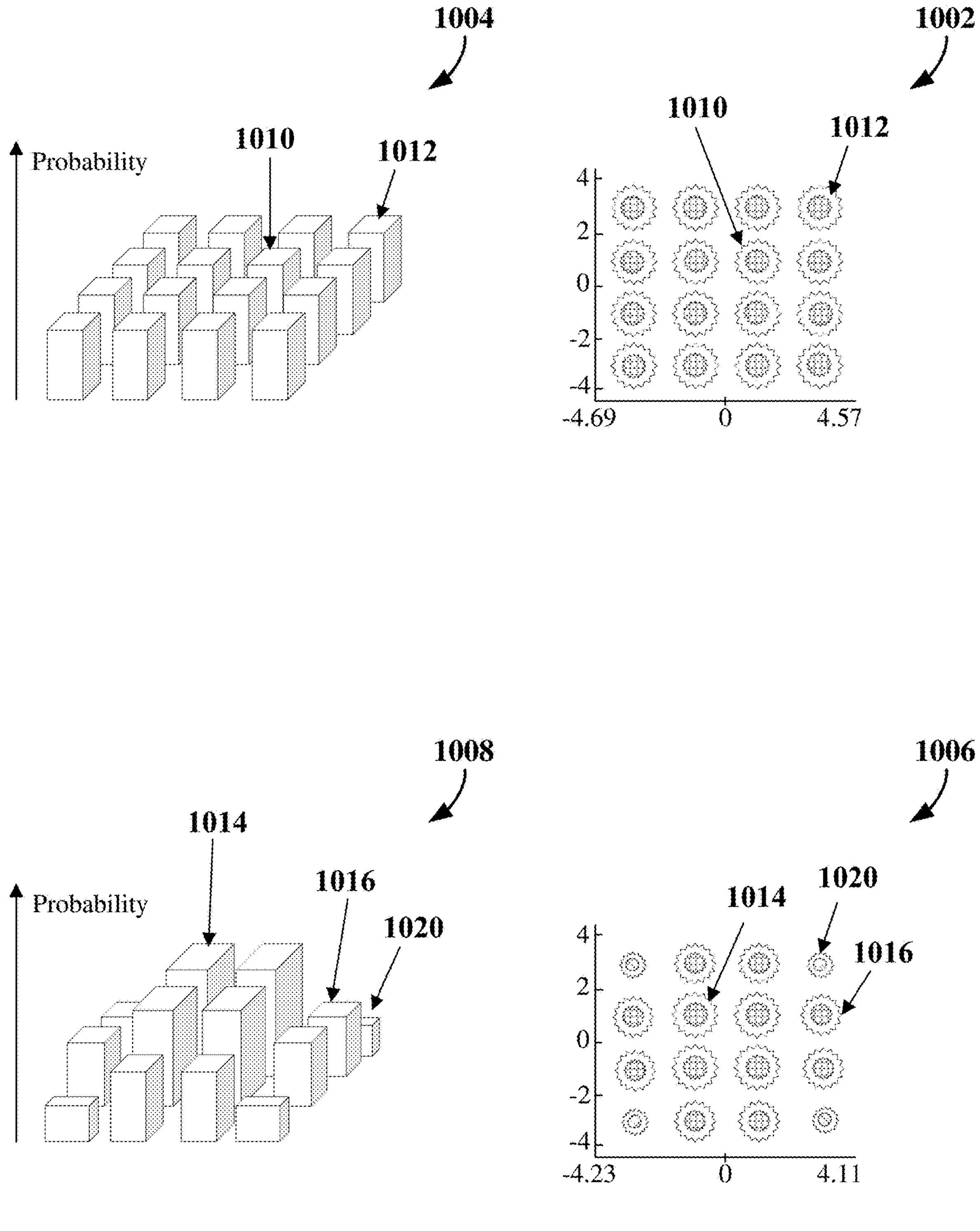
FIG. 10 is a conceptual illustration of examples of energy distributions in modulation constellations according to some aspects.

FIG. 10 illustrates an example of how a QAM constellation with uniformly distributed constellation points may differ from a QAM constellation with non-uniformly distributed constellation points. A constellation diagram 1002 and associated probability map 1004 correspond to an example of uniformly distributed constellation points. In contrast, a constellation diagram 1006 and associated probability map 1008 correspond to an example of non-uniformly distributed constellation points.

The constellation diagram 1002 shows that the constellation points (e.g., point 1010 and point 1012) are uniformly distributed with respect to one another. That is, as further illustrated by the probability map 1004, the probability that the constellation includes a given constellation point (e.g., the point 1010, which may be associated with a lower energy or power) is approximately equal to the probability that the constellation includes another constellation point (e.g., the point 1012, which may be associated with a higher energy or power).

In contrast, the constellation diagram 1006 shows that the constellation points (e.g., point 1014, point 1016, and point 1018) are not uniformly distributed with respect to one another. That is, as further illustrated by the probability map 1008, the probability that the constellation includes a given constellation point (e.g., the point 1014, which may be associated with a lower energy or power) may be higher than the probability that the constellation includes another constellation point (e.g., the point 1016, which may be associated with a higher energy or power).

Figure 11:
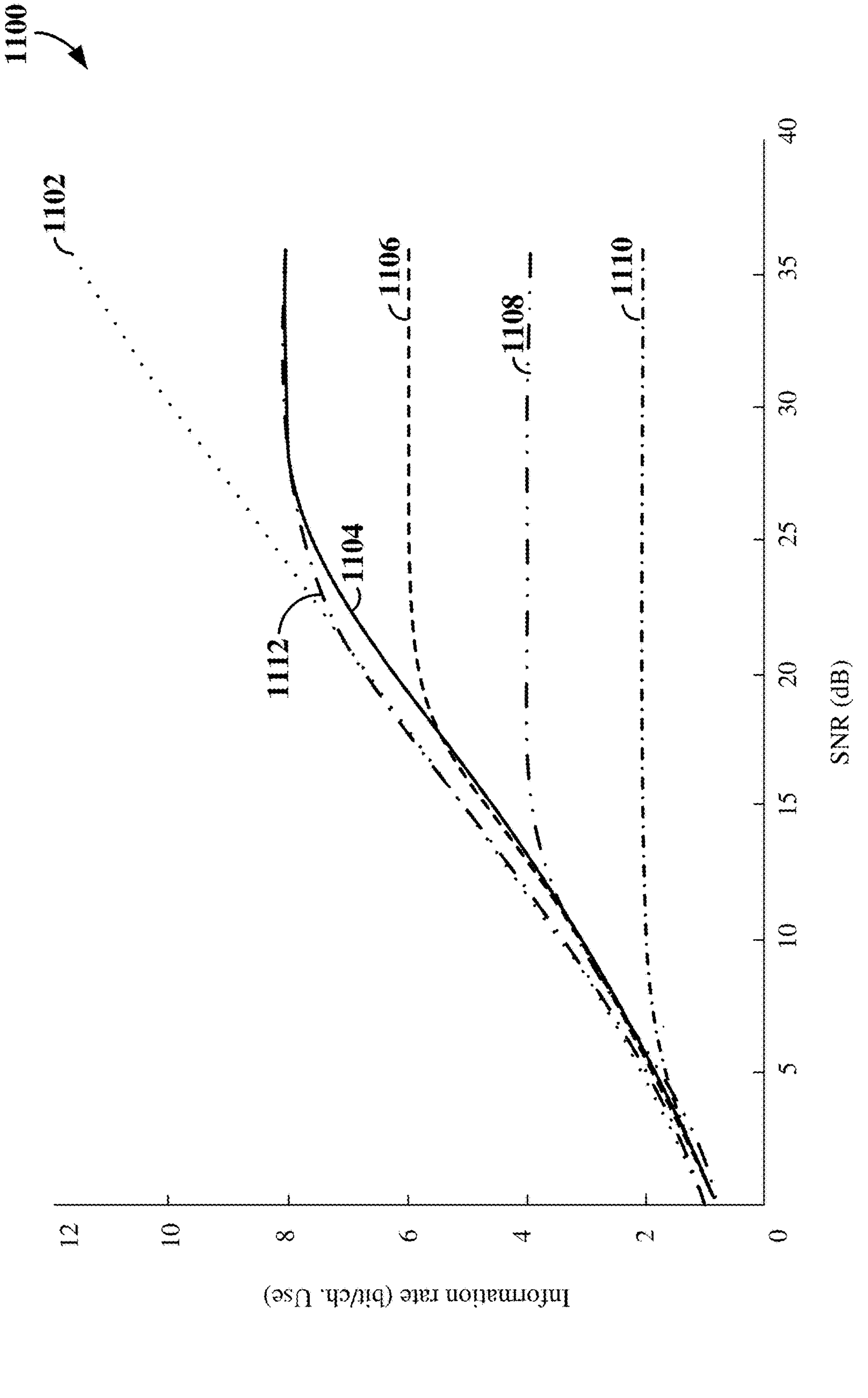
FIG. 11 is a diagram illustrating example signal-to-noise ratios according to some aspects.

FIG. 11 is a diagram 1100 illustrating example relationships between SNR and information rate for scenarios that use uniform modulation and a scenario that uses probabilistic shaping. A log (1+SNR) graph 1102 is provided as a base line, which is the largest mutual information that can be achieved at a given SNR, and is achieved by an input that is randomly Gaussian distributed. A graph 1104 illustrates an example that uses uniform 256 QAM. A graph 1104 illustrates an example that uses uniform 256 QAM. A graph 1106 illustrates an example that uses uniform 64 QAM. A graph 1108 illustrates an example that uses uniform 16 QAM. A graph 1110 illustrates an example that uses uniform QPSK. A graph 1112 illustrates an example that uses probabilistic shaping, with optimized constellation distribution based on the set of constellation points associated with 256 QAM. Here, it may be seen that the scenario that uses probabilistic shaping provides better performance (i.e., larger mutual information) than the scenarios that use uniform modulation.

Referring again to FIG. 9, if scrambling is applied after the channel coding 904, the scrambling will make the coded bits uniformly distributed. Thus, an advantage of probabilistic shaping may be lost. The disclosure relates in some aspects to scrambling designs for probabilistic shaped coded modulation systems that maintain an advantage of probabilistic shaping.

Figure 12:
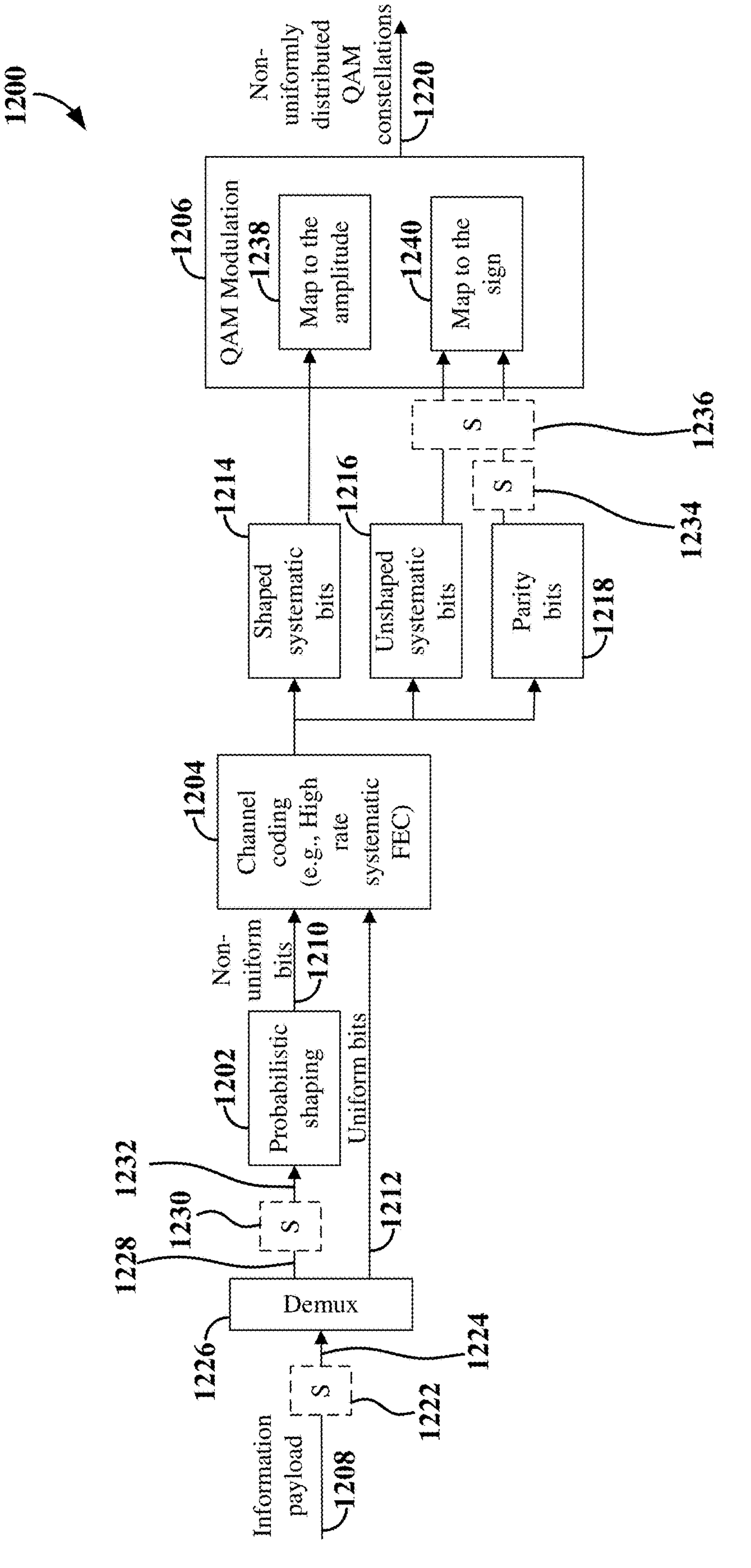
FIG. 12 is a schematic illustration of an example of scrambling and probabilistic shaping in a transmit chain according to some aspects.

In some examples of a probabilistic shaping or probabilistic amplitude shaping system, bit scrambling may be performed at one or more of the locations indicated in FIG. 12. In this example, scrambling may be applied prior to probabilistic shaping. In addition, scrambling may be applied to unshaped systematic bits and/or parity bits prior to modulation.

Similar to FIG. 9, FIG. 12 illustrates an example of a transmit chain 1200 that includes probabilistic shaping 1202 (e.g., a probabilistic shaper), channel coding 1204 (e.g., an encoder), and QAM modulation 1206 (e.g., a modulator). In some examples, the channel coding 1204 may include forward error correction (FEC). In some examples, the transmit chain 1200 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

The probabilistic shaping 1202 applies probabilistic shaping to at least some of the bits of an information payload 1208. The channel coding 1204 operates on a set of non-uniform bits 1210 output by the probabilistic shaping 1202 and a corresponding set of uniform bits 1212. The output of the channel coding 1204, including shaped systematic bits 1214 (e.g., corresponding to the non-uniform bits 1210), unshaped systematic bits 1216 (e.g., corresponding to the uniform bits 1212), and parity bits 1218, are modulated by the QAM modulation 1206 to generate non-uniformly distributed QAM constellations 1220.

In various examples, the output of the channel coding 1204 may be mapped to the QAM constellation in different ways. FIG. 12 illustrates an example where the shaped systematic bits 1214 are mapped 1238 to the amplitudes of the QAM constellation points, while the unshaped systematic bits 1216 and the parity bits 1218 are mapped 1240 to the signs of the QAM constellation points.

As illustrated in FIG. 12, for the shaped information bits, the scrambling is done prior to the probabilistic shaping 1202 and the channel coding 1204. As one example, an optional scrambler 1222 may scramble the information payload 1208 and provide scrambled bits 1224 to a demultiplexer (Demux) 1226. In this case, a first output 1228 of the demultiplexer 1226 provides scrambled bits to the probabilistic shaping 1202 and a second output of the demultiplexer 1226 provides the scrambled uniform bits 1212. As another example, the information payload 1208 is provided directly to the demultiplexer 1226. In this case, the first output 1228 of the demultiplexer 1226 is provided to an optional scrambler 1230 that provides scrambled bits 1232 to the probabilistic shaping 1202. In addition, the second output of the demultiplexer 1226 provides the unscrambled uniform bits 1212.

As further illustrated in FIG. 12, for the parity bits 1218 generated from the channel coding 1204, the scrambling is done after the channel coding 1204. For example, an optional scrambler 1234 may scramble the parity bits 1218 prior to the QAM modulation 1206.

FIG. 12 also illustrates that unshaped information bits may be scrambled either prior to or after the channel coding 1204. In the scenario that uses the scrambler 1222, the unshaped information bits are scrambled prior to the channel coding 1204. In the scenario that uses the scrambler 1230, the unshaped information bits (unshaped systematic bits 1216) may be scrambled by an optional scrambler 1236 prior to the QAM modulation 1206.

In some examples, a common scrambling may be used for the shaped information bits and unshaped information bits (e.g., using a long scrambling sequence). For example, this may be done by the scrambler 1222 prior to the probabilistic shaping 1202 and the channel coding 1204.

In some examples, the unshaped systematic bits 1216 and the parity bits 1218 can be scrambled together (e.g., using a long scrambling sequence). For example, this may be done by the scrambler 1236 prior to the QAM modulation 1206.

In some examples, the three bit streams can be separately scrambled. For example, shaped information bits may be scrambled by the scrambler 1230, parity bits 1218 may be scrambled by the scrambler 1234, and unshaped systematic bits 1216 may be scrambled by the scrambler 1236 (where the scrambler 1236 does not scramble the parity bits).

Figure 13:
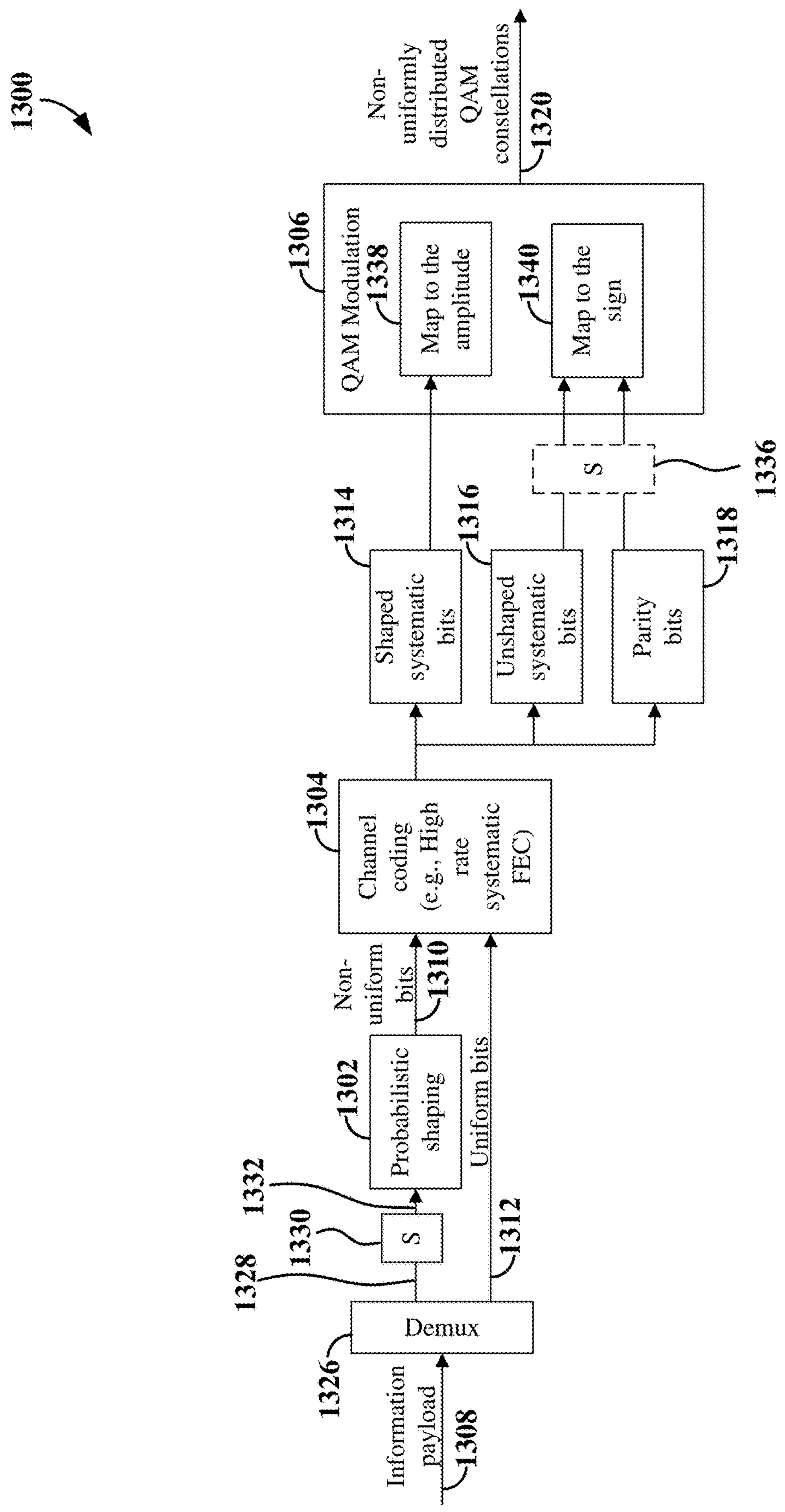
FIG. 13 is a schematic illustration of another example of scrambling and probabilistic shaping in a transmit chain according to some aspects.

FIG. 13 illustrates an example where the shaped information bits are scrambled independently of the unshaped information bits. Similar to FIG. 12, FIG. 13 illustrates an example of a transmit chain 1300 that includes probabilistic shaping 1302 (e.g., a probabilistic shaper), channel coding 1304 (e.g., an encoder), and QAM modulation 1306 (e.g., a modulator). In some examples, the channel coding 1304 may include forward error correction (FEC). In some examples, the transmit chain 1300 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

The probabilistic shaping 1302 applies probabilistic shaping to at least some of the bits of an information payload 1308. The channel coding 1304 operates on a set of non-uniform bits 1310 output by the probabilistic shaping 1302 and a corresponding set of uniform bits 1312. The output of the channel coding 1304, including shaped systematic bits 1314 (e.g., corresponding to the non-uniform bits 1310), unshaped systematic bits 1316 (e.g., corresponding to the uniform bits 1312), and parity bits 1318, are modulated by the QAM modulation 1306 to generate non-uniformly distributed QAM constellations 1320.

In various examples, the output of the channel coding 1304 may be mapped to the QAM constellation in different ways. FIG. 13 illustrates an example where the shaped systematic bits 1314 are mapped 1338 to the amplitudes of the QAM constellation points, while the unshaped systematic bits 1316 and the parity bits 1318 are mapped 1340 to the signs of the QAM constellation points.

As illustrated in FIG. 13, for the shaped information bits, the scrambling is done prior to the probabilistic shaping 1302 and the channel coding 1304. Here, the information payload 1308 is provided directly to a demultiplexer 1326. In this case, a first output 1328 of the demultiplexer 1326 is provided to a scrambler 1330 that provides scrambled bits 1332 to the probabilistic shaping 1302. In addition, the second output of the demultiplexer 1326 provides the uniform bits 1312.

As further illustrated in FIG. 13, for the parity bits 1318 and the unshaped systematic bits 1316, the scrambling is done after the channel coding 1304. For example, a scrambler 1336 may scramble the parity bits 1318 and the unshaped systematic bits 1316 prior to the QAM modulation 1306. As noted above, the parity bits 1318 and the unshaped systematic bits 1316 can be scrambled together (e.g., using a long scrambling sequence) or scrambled independently.

Figure 14:
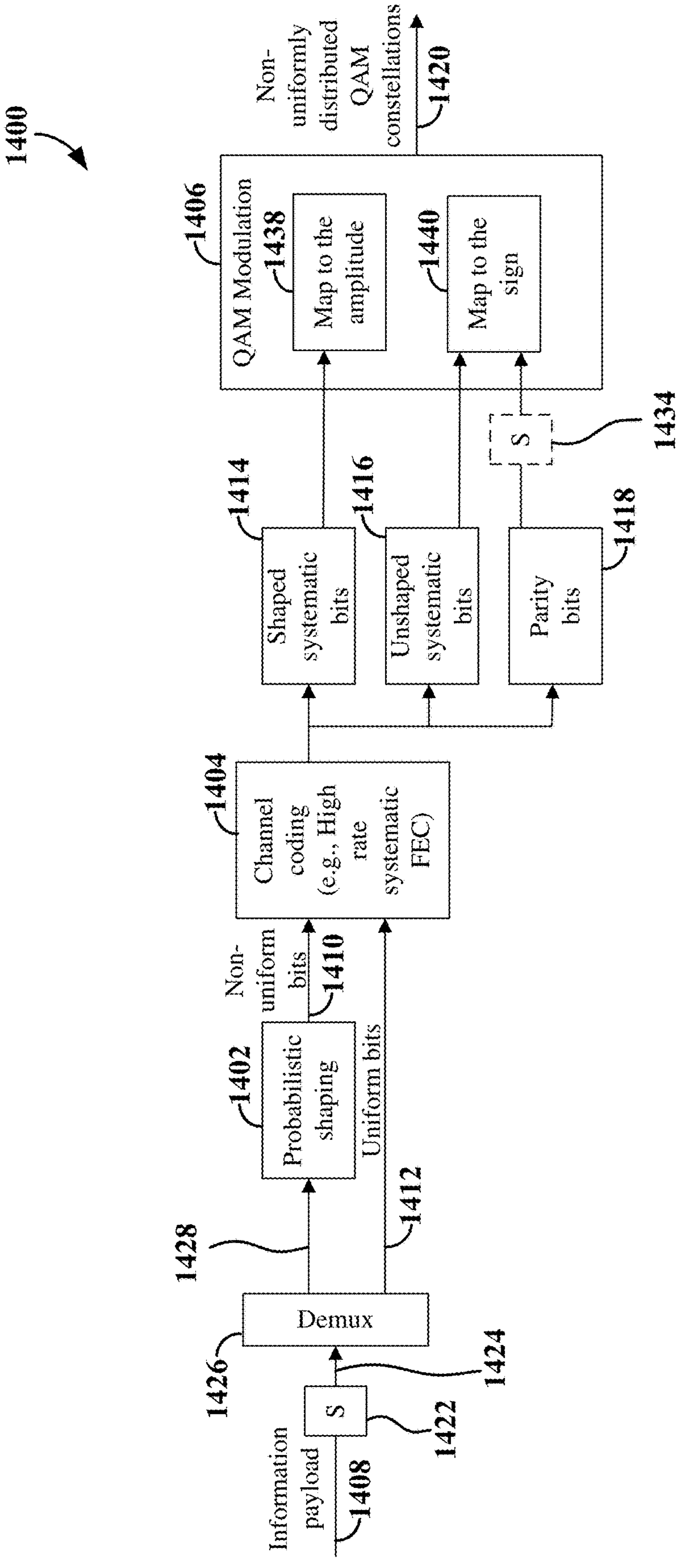
FIG. 14 is a schematic illustration of another example of scrambling and probabilistic shaping in a transmit chain according to some aspects.

FIG. 14 illustrates an example where a common scrambling may be used for the shaped information bits and unshaped information bits (e.g., using a long scrambling sequence). Similar to FIG. 12, FIG. 14 illustrates an example of a transmit chain 1400 that includes probabilistic shaping 1402 (e.g. a probabilistic shaper), channel coding 1404 (e.g., an encoder), and QAM modulation 1406 (e.g. a modulator). In some examples, the channel coding 1404 may include forward error correction (FEC). In some examples, the transmit chain 1400 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

The probabilistic shaping 1402 applies probabilistic shaping to at least some of the bits of an information payload

1408. The channel coding 1404 operates on a set of non-uniform bits 1410 output by the probabilistic shaping 1402 and a corresponding set of uniform bits 1412. The output of the channel coding 1404, including shaped systematic bits 1414 (e.g., corresponding to the non-uniform bits 1410), unshaped systematic bits 1416 (e.g., corresponding to the uniform bits 1412), and parity bits 1418, are modulated by the QAM modulation 1406 to generate non-uniformly distributed QAM constellations 1420.

In various examples, the output of the channel coding 1404 may be mapped to the QAM constellation in different ways. FIG. 14 illustrates an example where the shaped systematic bits 1414 are mapped 1438 to the amplitudes of the QAM constellation points, while the unshaped systematic bits 1416 and the parity bits 1418 are mapped 1440 to the signs of the QAM constellation points.

As illustrated in FIG. 14, for the shaped information bits, the scrambling is done prior to the probabilistic shaping 1402 and the channel coding 1404. A scrambler 1422 may scramble the information payload 1408 and provide scrambled bits 1424 to a demultiplexer (Demux) 1426. In this case, a first output 1428 of the demultiplexer 1426 provides scrambled bits to the probabilistic shaping 1402 and a second output of the demultiplexer 1426 provides scrambled uniform bits 1412.

As further illustrated in FIG. 14, for the parity bits, the scrambling is done after the channel coding 1404. For example, a scrambler 1434 may scramble the parity bits 1418 prior to the QAM modulation 1406.

Figure 15:
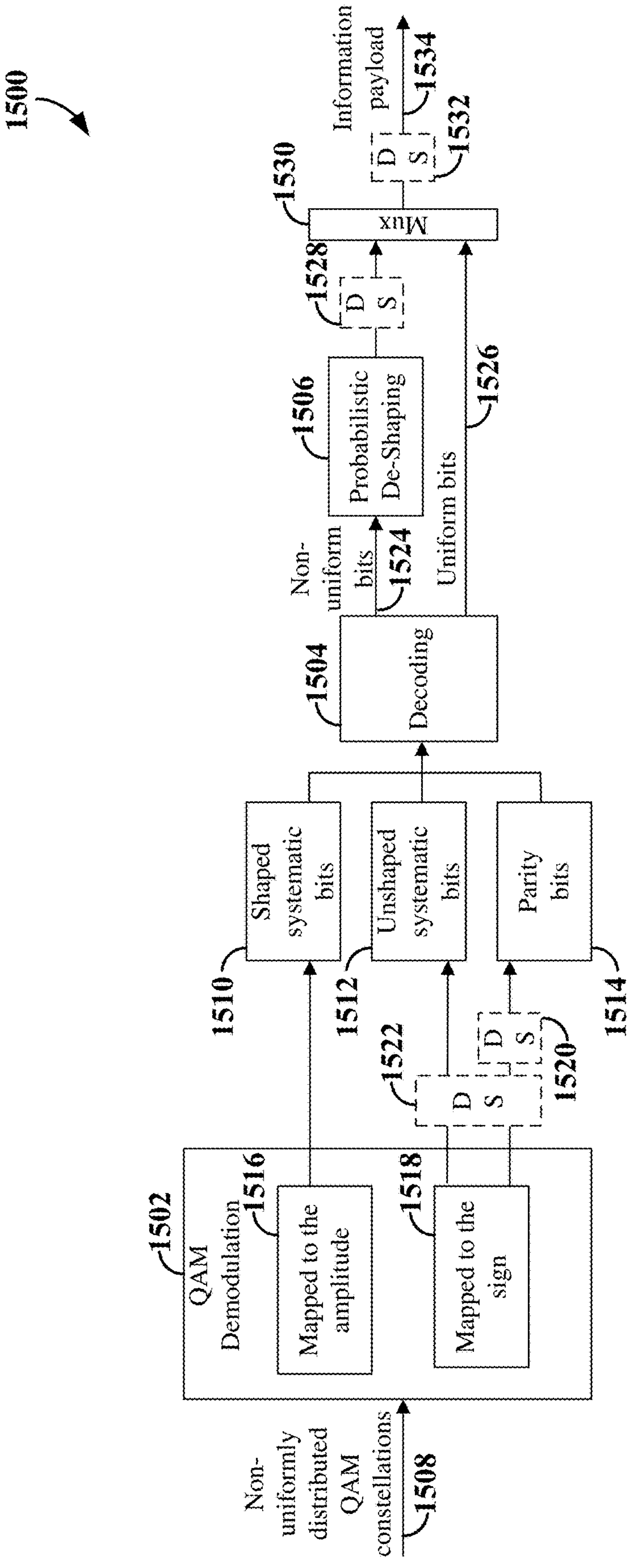
FIG. 15 is a schematic illustration of an example of descrambling and probabilistic de-shaping in a receive chain according to some aspects.

FIG. 15 illustrates an example of a receive chain 1500 that may receive a signal transmitted by the transmit chain 1200, 1300, or 1400 of FIG. 12, 13, or 14. In some examples, the receive chain 1500 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

The receive chain 1500 includes QAM demodulation 1502 (e.g., a demodulator), decoding 1504 (e.g., a decoder), and probabilistic de-shaping 1506 (e.g., a probabilistic de-shaper). A received signal 1508 consisting of non-uniformly distributed QAM constellations (e.g., corresponding to the non-uniformly distributed QAM constellations 1220, 1320, or 1420 of FIG. 12, 13, or 14) is demodulated by the QAM demodulation 1502. The QAM demodulation 1502 outputs shaped systematic bits 1510, unshaped systematic bits 1512, and parity bits 1514 (e.g., corresponding to the shaped systematic bits 1214, 1314, or 1414, unshaped systematic bits 1216, 1316, or 1416, and parity bits 1218, 1318, or 1418 of FIG. 12, 13, or 14).

Similar to the discussion above, the shaped systematic bits 1510, unshaped systematic bits 1512, and parity bits 1514 may be mapped to the QAM constellation in different ways. FIG. 15 illustrates an example where the shaped systematic bits 1510 are mapped 1516 to the amplitudes of the QAM constellation points, while the unshaped systematic bits 1512 and the parity bits 1514 are mapped 1518 to the signs of the QAM constellation points.

As further illustrated in FIG. 15, demodulated parity bits may be descrambled by an optional descrambler 1520. In addition, demodulated unshaped systematic bits may be descrambled by an optional descrambler 1522. In some examples, the unshaped systematic bits and the parity bits can be descrambled together (e.g., using a long scrambling sequence). For example, this may be done by the optional descrambler 1522.

The decoding 1504 decodes the shaped systematic bits 1510, the unshaped systematic bits 1512, and the parity bits 1514 according to the channel coding applied by the channel coding 1204, 1304, or 1404 of FIG. 12, 13, or 14. Thus, the decoding 1504 outputs non-uniform bits 1524 and uniform bits 1526 corresponding to the non-uniform bits 1210, 1310, or 1410 and uniform bits 1212, 1312, or 1412 of FIG. 12, 13, or 14.

The probabilistic de-shaping 1506 applies to the non-uniform bits 1524 the inverse of the probabilistic shaping 1202, 1302, or 1402 of FIG. 12, 13, or 14. For example, the probabilistic de-shaping 1506 may be configured to map a bit sequence with a non-uniform distribution (e.g., a Gaussian distribution) to a bit sequence with a uniform distribution.

For a scenario where the receive chain 1500 receives a signal transmitted by the transmit chain 1300 of FIG. 13 (e.g., that uses the scrambler 1330), the output of the probabilistic de-shaping 1506 may be descrambled by an optional descrambler 1528 prior to the multiplexer (Mux) 1530. In some examples, the descrambler 1528 may apply the inverse operation of the scrambler 1330. The multiplexer (Mux) 1530 may then multiplex the output of the descrambler 1528 with the uniform bits 1526 to provide the recovered information payload 1534.

Conversely, for a scenario where the receive chain 1500 receives a signal transmitted by the transmit chain 1400 of FIG. 14 (e.g., that uses the scrambler 1422), the output of the probabilistic de-shaping 1506 may be multiplexed with the uniform bits 1526 by the multiplexer (Mux) 1530. The multiplexed output may then be descrambled by an optional descrambler 1532 to provide the recovered information payload 1534. In some examples, the descrambler 1532 may apply the inverse operation of the scrambler 1422.

In some examples, scrambling for probabilistic shaping may be used in conjunction with incremental redundancy HARQ (IR-HARQ) retransmissions. For example, the implementations of FIGS. 12-14 may be used for a first transmission (1st Tx) of a transmission block (TB) in some scenarios. For a retransmission under IR-HARQ, the bits that are retransmitted may be different from the bits in the initial transmission. Consequently, the distribution of the transmitted symbols may also be different. For example, for a retransmission, there may be portions of the bits that are shaped (non-uniform distribution), and portions of the bits that are unshaped (uniform distribution).

Figure 16:
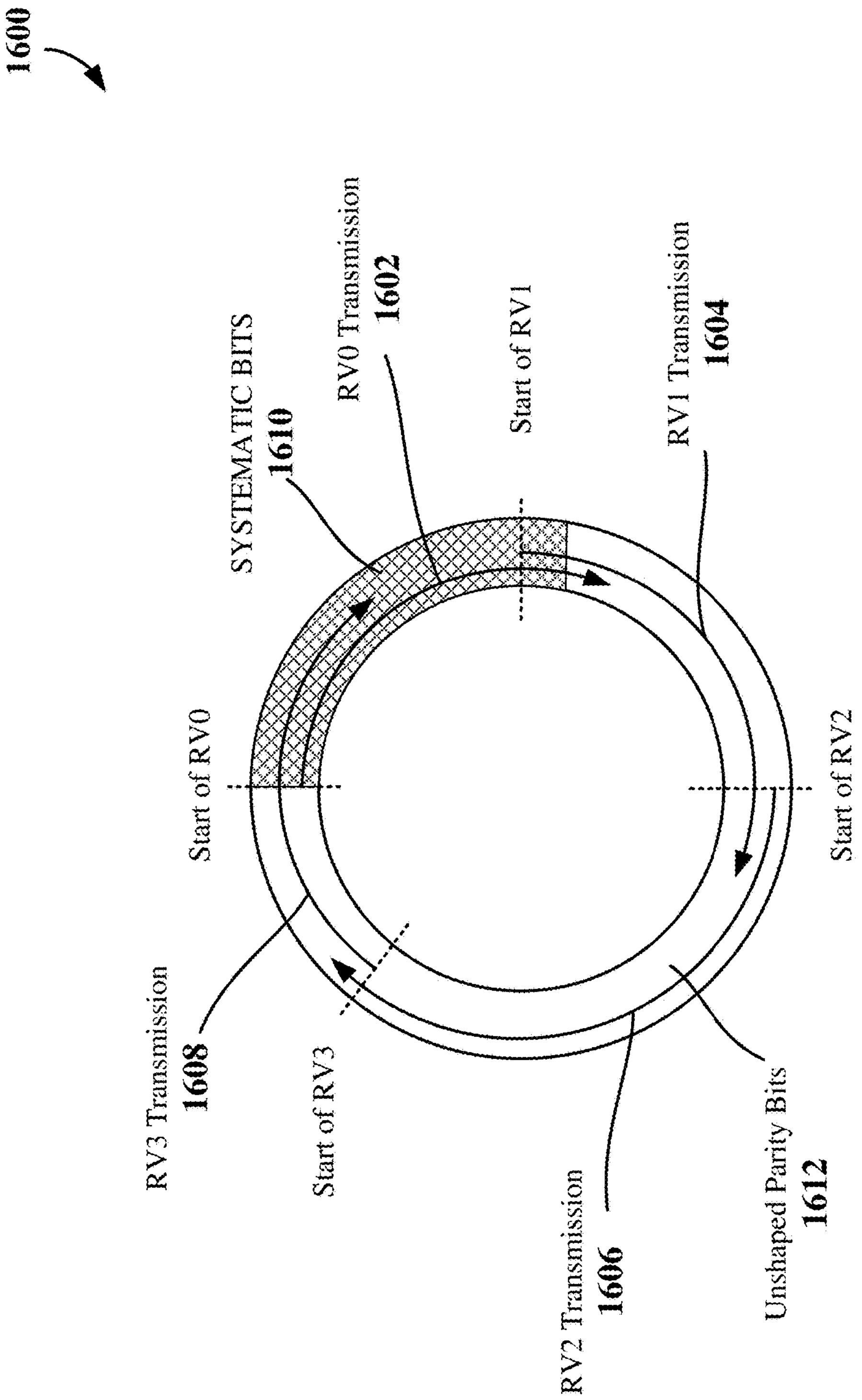
FIG. 16 is a conceptual illustration of a circular buffer and redundancy versions according to some aspects.

FIG. 16 illustrates a circular buffer 1600 and associated redundancy vectors (RVs) that may be used to transmit and retransmit a set of data (e.g., a TB). A transmitting device may transmit data bits from the circular buffer 1600, potentially repeating some of the data bits depending on the amount of resources allocated for the transmission. For example, one or more bits from the buffer may be modulated (e.g., by generating a QAM symbol) and sent via a resource element (RE). This process is repeated for successive bits in the circular buffer 1600 until all of the allocated REs are used. If the number of allocated resources is larger than the size needed to send all of the data bits in the circular buffer 1600, the transmission may continue until all of the resources are used (e.g., data bits may be sent more than once). Thus, for a given transmission, the data being transmitted will be rate-matched to the resources (e.g., REs) allocated for the transmission.

The circular buffer 1600 conceptually illustrates that different bits may be associated with different RVs. A transmission using RV0 is represented by a first arrowed line 1602, a transmission using RV1 is represented by a second arrowed line 1604, a transmission using RV2 is represented by a third arrowed line 1606, and a transmission using RV3 is represented by a fourth arrowed line 1608. Other types of RVs may be used in other examples.

The shading depicted in FIG. 16 represents systematic bits 1610. Here, it may be seen that RV0 and RV3 contain a significant number of systematic bits and are, as a result, self-decodable (e.g., it may be possible for a receiving device to decode the data using these bits, without the need for additional bits). Thus, an initial transmission by a device may start at the beginning of RV0 or RV3 so that the initial transmission may be self-decodable at a receiving device.

In contrast, RV1 and RV2 do not contain a significant number of systematic bits (e.g., they may primarily include parity bits 1612). Thus, RV1 and RV2 are not self-decodable (e.g., it is generally not possible for a receiving device to decode the data using these bits alone). However, RV1 and RV 2 may be used for a retransmission (e.g., the retransmission may start at the beginning of RV 1 or RV 2), whereby the bits of the retransmission are combined at the receiver with the bits of the initial transmission.

In some examples, to support IR-HARQ, the bits to be transmitted may be scrambled and stored in the HARQ buffer. In this case, the transmission may simply read the scrambled bits from the HARQ buffer. As discussed above in the examples of FIGS. 12-14, the shaped bits and unshaped bits may be scrambled differently. Thus, since a retransmission can have arbitrary portions of shaped/unshaped bits as discussed in the example of FIG. 16, the bit distribution for the retransmission might not be the same as the desired input distribution, which may complicate the transmit and receive operations. For example, an initial transmission with a substantial number of shaped bits may have a distribution of a desired shape (e.g., Gaussian). However, a retransmission that includes a substantial number of unshaped bits (e.g., parity bits) might not have that same distribution. A receiver that attempts to demodulate these transmitted signals might not know the distribution of the retransmission, thereby making the receive operation more difficult. Also, the power of the retransmission may be different from the power of the initial transmission. This difference in power may adversely affect the ability of the receiver to effectively decode the transmitted signals.

The disclosure relates in some aspects to using different scrambling procedures for initial transmissions versus retransmissions. For example, for an initial transmission, the shaped bits may be left unscrambled (e.g., after probabilistic shaping). In this way, the probability distribution of these bits may be preserved (as discussed above, these bit may be designed to maximize the mutual information).

For the retransmissions, however, scrambling may be applied to the shaped bits to remove the non-uniform distribution on the shaped bits. In some aspects, a goal here may be to enforce the same distribution on the set of retransmitted constellations, regardless of whether these constellations are generated from information bits/systematic bits or parity bits. Thus, by configuring a receiver to expect that the retransmissions are scrambled in this way, the receiver may readily decode a retransmission since the receiver will know that the bits of the retransmission are evenly distributed (i.e., equiprobable over 0 and 1).

One potential benefit of using different approaches for an initial transmission versus a retransmission is that the receiver may simply implement a demodulator that handles two distributions: a non-uniform distribution on the constellation point in the initial transmission, and a uniform distribution on the constellation point in the retransmission. In contrast, if additional scrambling is not applied in the retransmission, then a receiver may need to implement a demodulator for a large number of (different) distributions.

To support the use of different approaches for an initial transmission versus a retransmission, an additional scrambler may be used, either on the shaped bits only, or on all bits (both unshaped and shaped bits) for the retransmission. This will make all bits uniformly distributed, thus providing a fallback to uniform QAM transmission.

As mentioned above, the majority of the bits in RV0 and RV3 may be systematic bits in some cases (e.g., in 5G NR, RV0 and RV3 may be designed to maximize self-decodability). In contrast, the majority of the bits in RV1 and RV2 may be parity bits in some cases (e.g., in 5G NR, RV1 and RV2 may be designed to maximize the HARQ-IR combining gain). Thus, in some examples, a decision regarding whether to apply scrambling on the shaped bits (e.g., whether to use an additional scrambler on the shaped bits) or not may depend on the redundancy version (RV) of the retransmission (e.g., RV0 and RV3 do not use the additional scrambler, while RV1 and RV2 use the additional scrambler). Here, it may be desirable to not scramble RV0 and RV3 to preserve the self-decodability of these bits. In contrast, it may be desirable to scramble RV1 and RV2 to simplify the receiver design as discussed above.

In other communication systems (e.g., 6G, next generation wireless communication), the RV design may be different from the 5G NR design. However, the same principle discussed above could be applied for these other communication systems as well. For the RVs that are aimed for self-decodability, scrambling is not applied on the shaped bits. For RVs that are aimed for IR combining gain (e.g., where the number of the parity bits is maximized), scrambling is applied on the shaped bits.

In some examples, the transmitter could indicate to the receiver whether the additional scrambling is applied or not (e.g., in uplink control information or downlink control information). In some examples, the transmitter may receive an indication (e.g., in uplink control information or downlink control information) specifying whether the transmitter is to use the additional scrambler for a retransmission.

Figure 17:
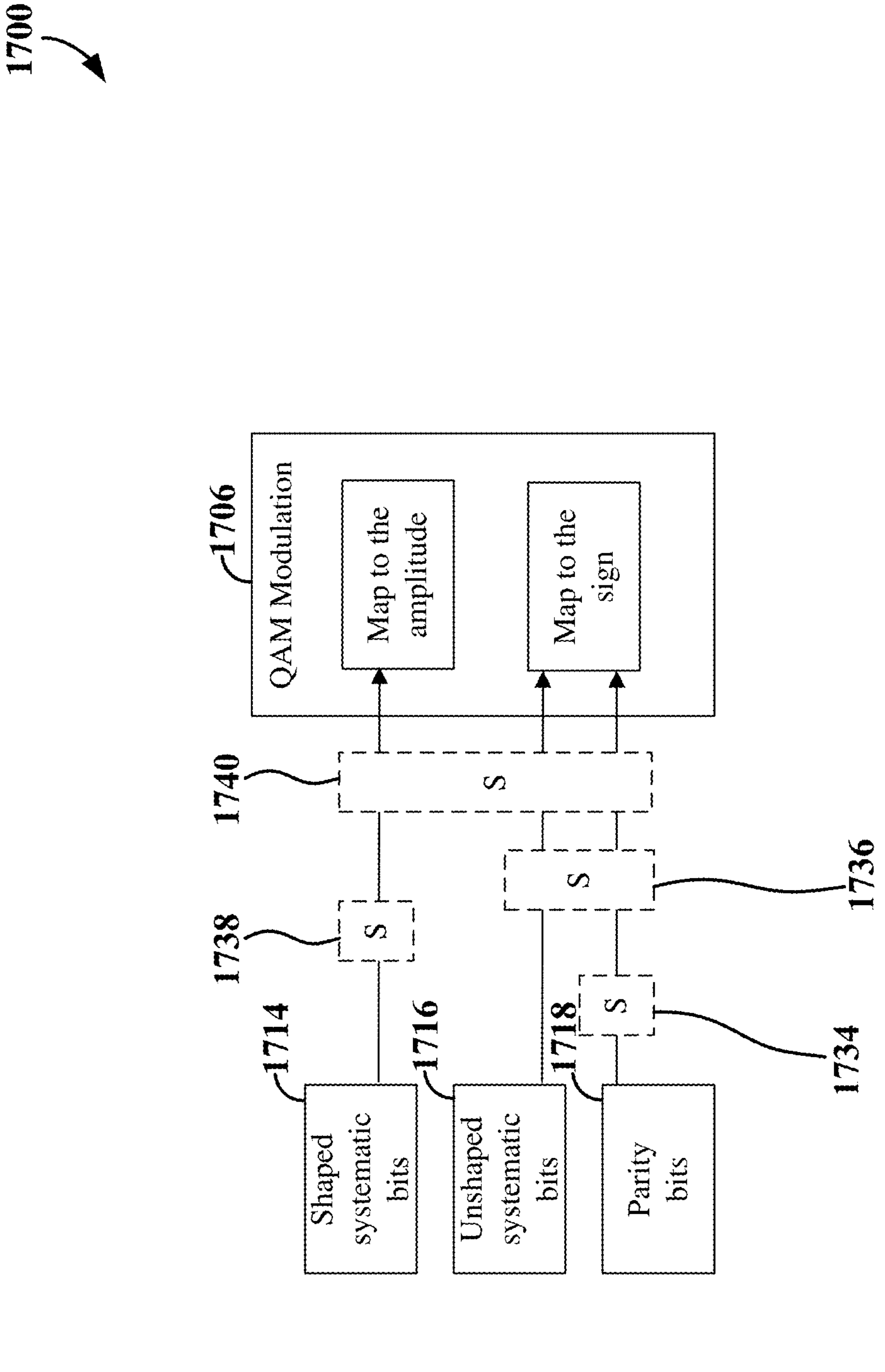
FIG. 17 is a schematic illustration of an example of scrambling for a retransmission according to some aspects.

FIG. 17 illustrates an example of a portion of a transmit chain 1700 (e.g., a portion of the transmit chain 1200, 1300, or 1400 of FIG. 12, 13, or 14) illustrating that scrambling may optionally be applied to shaped systematic bits for a retransmission (e.g., based on the RV of the retransmission or based on a received indication). In some examples, the transmit chain 1700 may be implemented in any of the apparatuses, UEs, scheduled entities, base stations (e.g., gNBs), scheduling entities, distributed units, control units, RAN nodes, or CN entities shown in any of FIGS. 1, 2, 4, 5, 18, and 20.

The shaped systematic bits 1714, the unshaped systematic bits 1716, and the parity bits 1718 may correspond to the shaped systematic bits 1214, 1314, or 1414, the unshaped systematic bits 1216, 1316, or 1416, and the parity bits 1218, 1318, or 1418 of FIG. 12, 13, or 14. As discussed above, prior to the QAM modulation 1706 for the initial transmission, scrambling (by a scrambler 1734) may be applied just to the parity bits 1718 or scrambling (by a scrambler 1736) may be applied to the unshaped systematic bits and the parity bits.

Moreover, to support retransmissions, an optional scrambler 1738 or 1740 may be used to scramble the shaped systematic bits 1714. For example, the scrambler 1738 may be used to independently scramble the shaped systematic bits 1714 for a retransmission (e.g., based on the RV of the retransmission or based on a received indication). As another example, the scrambler 1740 may be used to scramble the shaped systematic bits 1714, the unshaped systematic bits 1716, and the parity bits 1718 together for a retransmission (e.g., based on the RV of the retransmission or based on a received indication). As discussed above, the scrambler 1738 or 1740 would not be used for the initial transmission.

Figure 18:
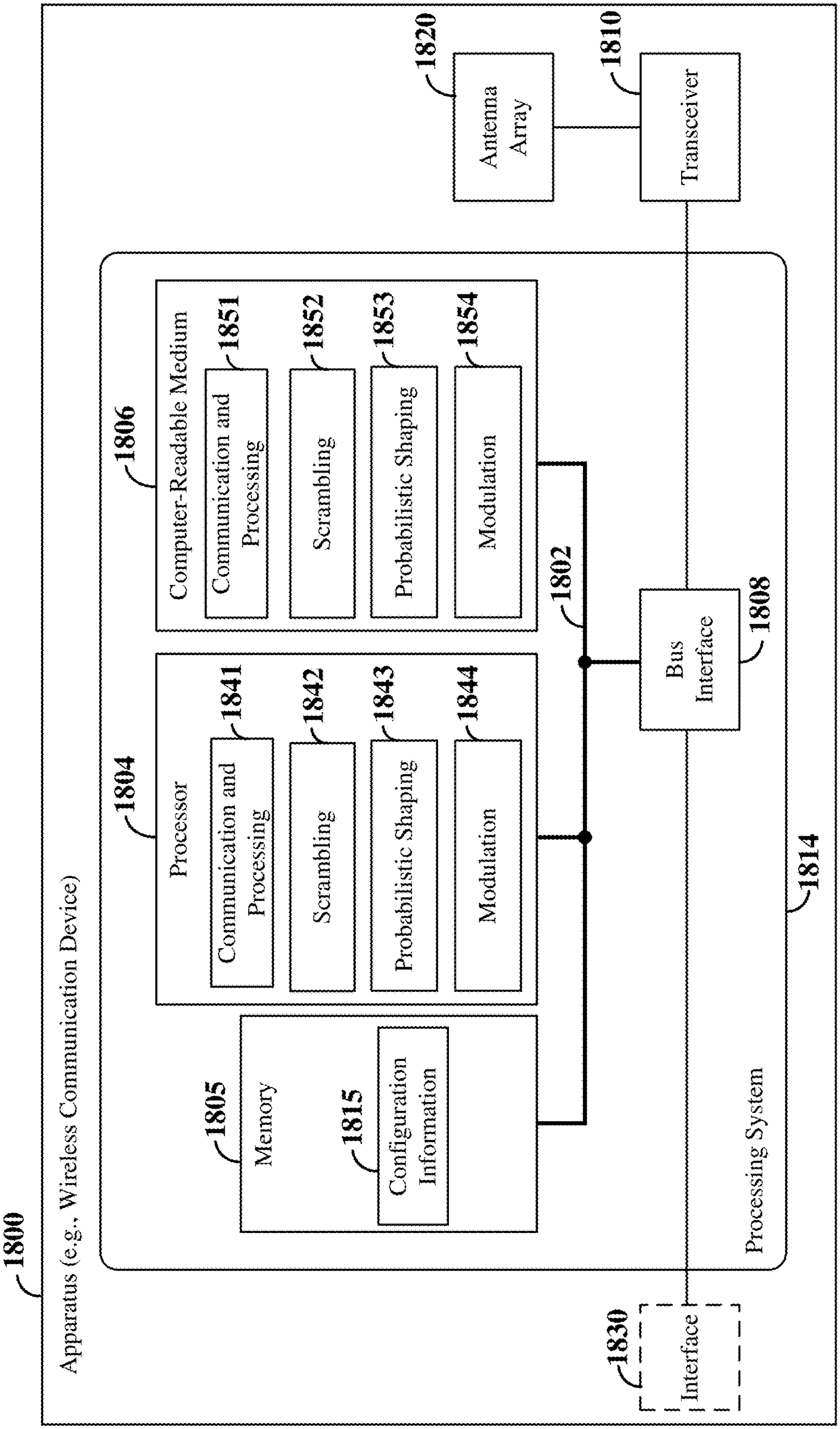
FIG. 18 is a block diagram illustrating an example of a hardware implementation for an apparatus (e.g., a wireless communication device) employing a processing system according to some aspects.

FIG. 18 is a block diagram illustrating an example of a hardware implementation for an apparatus 1800 employing a processing system 1814. In some implementations, the apparatus 1800 may correspond to any of the UEs, scheduled entities, base stations (e.g., gNBs), scheduling entities, distributed units, control units, RAN nodes, or CN entities shown in any of FIGS. 1, 2, 4, and 5. In some examples, the apparatus 1800 may include any of the transmit chains and/or receive chains shown in any of FIGS. 6-9, 12-15, and 17.

In accordance with various aspects of the disclosure, an element, or any portion of an element, or any combination of elements may be implemented with the processing system 1814. The processing system 1814 may include one or more processors 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1800 may be configured to perform any one or more of the functions described herein. That is, the processor 1804, as utilized in the apparatus 1800, may be used to implement any one or more of the processes and procedures described herein.

In examples where the wireless communication device is a scheduled entity (e.g., a UE or a radio unit), the processor 1804 may in some instances be implemented via a baseband or modem chip and in other implementations, the processor 1804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In examples where the wireless communication device is a scheduling entity (e.g., a base station or a control unit), the processor 1804 may be configured to generate, schedule, and modify a resource assignment or grant of time-frequency resources (e.g., a set of one or more resource elements). For example, the processor 1804 may schedule time-frequency resources within a plurality of time division duplex (TDD) and/or frequency division duplex (FDD) subframes, slots, and/or mini-slots to carry user data traffic and/or control information to and/or from multiple UEs. The processor 1804 may further be configured to schedule resources for the transmission of an uplink signal. The processor 1804 may be configured to schedule uplink resources that may be utilized by the UE to transmit an uplink message (e.g., a PUCCH, a PUSCH, a PRACH occasion, or an RRC message). In some examples, the processor 1804 may be configured to schedule uplink resources in response to receiving a scheduling request from the UE.

In the example of FIG. 18, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art, and therefore, will not be described any further. A bus interface 1808 provides an interface between the bus 1802 and a transceiver 1810 and between the bus 1802 and an interface 1830. The transceiver 1810 provides a communication interface or means for communicating with various other apparatus over a wireless transmission medium. In some examples, the apparatus 1800 may include at least one transceiver 1810 and at least one antenna array 1820. A transceiver 1810 may include at least one transmitter circuit and/or at least one receiver circuit (e.g., as discussed above in conjunction with FIGS. 5-15). The interface 1830 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1830 may include a user interface (e.g., keypad, display, speaker, microphone, joystick). Of course, such a user interface is optional, and may be omitted in some examples, such as an IoT device.

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software. For example, the memory 1805 may store configuration information 1815 (e.g., scrambling information and/or probabilistic shaping information) used by the processor 1804 in cooperation with the transceiver 1810 for transmitting and/or receiving signals.

One or more processors 1804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1806.

The computer-readable medium 1806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1800 may be configured to perform any one or more of the operations described herein (e.g., as described above in conjunction with FIGS. 1-15 and as described below in conjunction with FIG. 19). In some aspects of the disclosure, the processor 1804, as utilized in the apparatus 1800, may include circuitry configured for various functions.

The processor 1804 may include communication and processing circuitry 1841. The communication and processing circuitry 1841 may be configured to communicate with another wireless communication device. The communication and processing circuitry 1841 may include one or more hardware components that provide the physical structure that performs various processes related to wireless communication (e.g., signal reception and/or signal transmission) as described herein. The communication and processing circuitry 1841 may further include one or more hardware components that provide the physical structure that performs various processes related to signal processing (e.g., processing a received signal and/or processing a signal for transmission) as described herein. In some examples, the communication and processing circuitry 1841 may include two or more transmit/receive chains. The communication and processing circuitry 1841 may further be configured to execute communication and processing software 1851 included on the computer-readable medium 1806 to implement one or more functions described herein.

The communication and processing circuitry 1841 may further be configured to control the antenna array 1820 and the transceiver 1810 to generate and transmit beamformed signals (e.g., at a mmWave frequency, etc.). Similarly, the communication and processing circuitry 1841 may further be configured to control the antenna array 1820 and the transceiver 1810 to receive and process beamformed signals.

In examples where the apparatus 1800 is a radio unit, the communication and processing circuitry 1841 may further be configured to communicate with a distributed unit via a first link (e.g., a fronthaul link) and a set of one or more child nodes (e.g., UEs) via respective second links (e.g., access links). In some examples, the communication and processing circuitry 1841 may further be configured to communicate with a child node via a fronthaul link.

In examples where the apparatus 1800 is a distributed unit, the communication and processing circuitry 1841 may be configured to communicate with a radio unit via a fronthaul link. In some implementations, the communication and processing circuitry 1841 may be configured to communicate with a parent node via one or more midhaul and/or backhaul links.

In some implementations where the communication involves obtaining (e.g., receiving) information, the communication and processing circuitry 1841 may obtain information from a component of the apparatus 1800 (e.g., from the transceiver 1810 that receives the information via radio frequency signaling or some other type of signaling suitable for the applicable communication medium), process (e.g., decode) the information, and output the processed information. For example, the communication and processing circuitry 1841 may output the information to another component of the processor 1804, to the memory 1805, or to the bus interface 1808. In some examples, the communication and processing circuitry 1841 may receive one or more of signals, messages, other information, or any combination thereof. In some examples, the communication and processing circuitry 1841 may receive information via one or more channels. In some examples, the communication and processing circuitry 1841 may include functionality for a means for receiving. In some examples, the communication and processing circuitry 1841 may include functionality for a means for obtaining (e.g., obtaining a signal from another device). In some examples, the communication and processing circuitry 1841 may include functionality for a means for receiving (e.g., receiving an RF signal). In some examples, the communication and processing circuitry 1841 may include functionality for a means for decoding.

In some implementations where the communication involves outputting (e.g., transmitting) information, the communication and processing circuitry 1841 may obtain information (e.g., from another component of the processor 1804, the memory 1805, or the bus interface 1808), process (e.g., encode) the information, and output the processed information. For example, the communication and processing circuitry 1841 may output the information to the transceiver 1810 (e.g., that transmits the information via radio frequency signaling or some other type of signaling suitable for the applicable communication medium). In some examples, the communication and processing circuitry 1841 may send one or more of signals, messages, other information, or any combination thereof. In some examples, the communication and processing circuitry 1841 may send information via one or more channels. In some examples, the communication and processing circuitry 1841 may include functionality for a means for sending. In some examples, the communication and processing circuitry 1841 may include functionality for a means for outputting (e.g., outputting a signal to another device). In some examples, the communication and processing circuitry 1841 may include functionality for a means for transmitting (e.g., transmitting an RF signal). In some examples, the communication and processing circuitry 1841 may include functionality for a means for encoding.

In some examples, the communication and processing circuitry 1841 may include functionality for a means for applying channel coding to bits of a signal. For example, the communication and processing circuitry 1841 may be configured to perform the operations of the channel coding 802 of FIG. 8, the channel coding 904 of FIG. 9, the channel coding 1204 of FIG. 12, the channel coding 1304 of FIG. 13, and the channel coding 1404 of FIG. 14.

In some examples, the communication and processing circuitry 1841 may include functionality for a means for demultiplexing a signal. For example, the communication and processing circuitry 1841 may be configured to perform the operations of the demultiplexer 1226 of FIG. 12, the demultiplexer 1326 of FIG. 13, and the demultiplexer 1426 of FIG. 14.

The processor 1804 may include scrambling circuitry 1842 configured to perform scrambling-related operations as discussed herein (e.g., one or more of the operations described in conjunction with FIGS. 8-15). The scrambling circuitry 1842 may be configured to execute scrambling software 1852 included on the computer-readable medium 1806 to implement one or more functions described herein.

The scrambling circuitry 1842 may include functionality for a means for scrambling a signal. For example, the scrambling circuitry 1842 may be configured to apply a pseudo-random scrambling sequence (e.g., based on a seed associated with the apparatus 1800 or another apparatus (e.g., a receiving device)) to a modulated signal. In some examples, the scrambling sequence is uniformly distributed. In some examples, the scrambling circuitry 1842 may perform an exclusive-OR (XOR) operation on an input bit sequence and a scrambling sequence. In some examples, the scrambling circuitry 1842 may be configured to perform the operations of the scrambling 804 of FIG. 8, the scrambler 1222, 1230, 1234, 1236 of FIG. 12, the scrambler 1330, 1336 of FIG. 13, the scrambler 1422, 1434 of FIG. 14, and the scrambler 1734, 1736, 1738, 1740 of FIG. 17.

The processor 1804 may include probabilistic shaping circuitry 1843 configured to perform probabilistic shaping-related operations as discussed herein (e.g., one or more of the operations described in conjunction with FIGS. 8-15). The probabilistic shaping circuitry 1843 may be configured to execute probabilistic shaping software 1853 included on the computer-readable medium 1806 to implement one or more functions described herein.

The probabilistic shaping circuitry 1843 may include functionality for a means for applying probabilistic shaping to a signal. For example, the probabilistic shaping circuitry 1843 may be configured to apply probabilistic amplitude shaping to a scrambled signal. In some examples, the probabilistic shaping circuitry 1843 maps a uniform bit sequence to a bit sequence with a desired distribution (e.g., a Gaussian distribution). In some examples, the probabilistic shaping circuitry 1843 may be configured to perform the operations of the probabilistic shaping 902 of FIG. 9, the probabilistic shaping 1202 of FIG. 12, the probabilistic shaping 1302 of FIG. 13, and the probabilistic shaping 1402 of FIG. 14.

The processor 1804 may include modulation circuitry 1844 configured to perform modulation-related operations as discussed herein (e.g., one or more of the operations described in conjunction with FIGS. 8-15). The modulation circuitry 1844 may be configured to execute modulation software 1854 included on the computer-readable medium 1806 to implement one or more functions described herein.

The modulation circuitry 1844 may include functionality for a means for modulating a signal. For example, the modulation circuitry 1844 may be configured to apply QAM to a signal that comprises shaped systematic bits, unshaped systematic bits, and parity bits. In some examples, the modulation circuitry 1844 may be configured to perform the operations of the modulation 806 of FIG. 8, the QAM modulation 906 of FIG. 9, the QAM modulation 1206 of FIG. 12, the QAM modulation 1306 of FIG. 13, the QAM modulation 1406 of FIG. 14, and the QAM modulation 1706 of FIG. 17.

Figure 19:
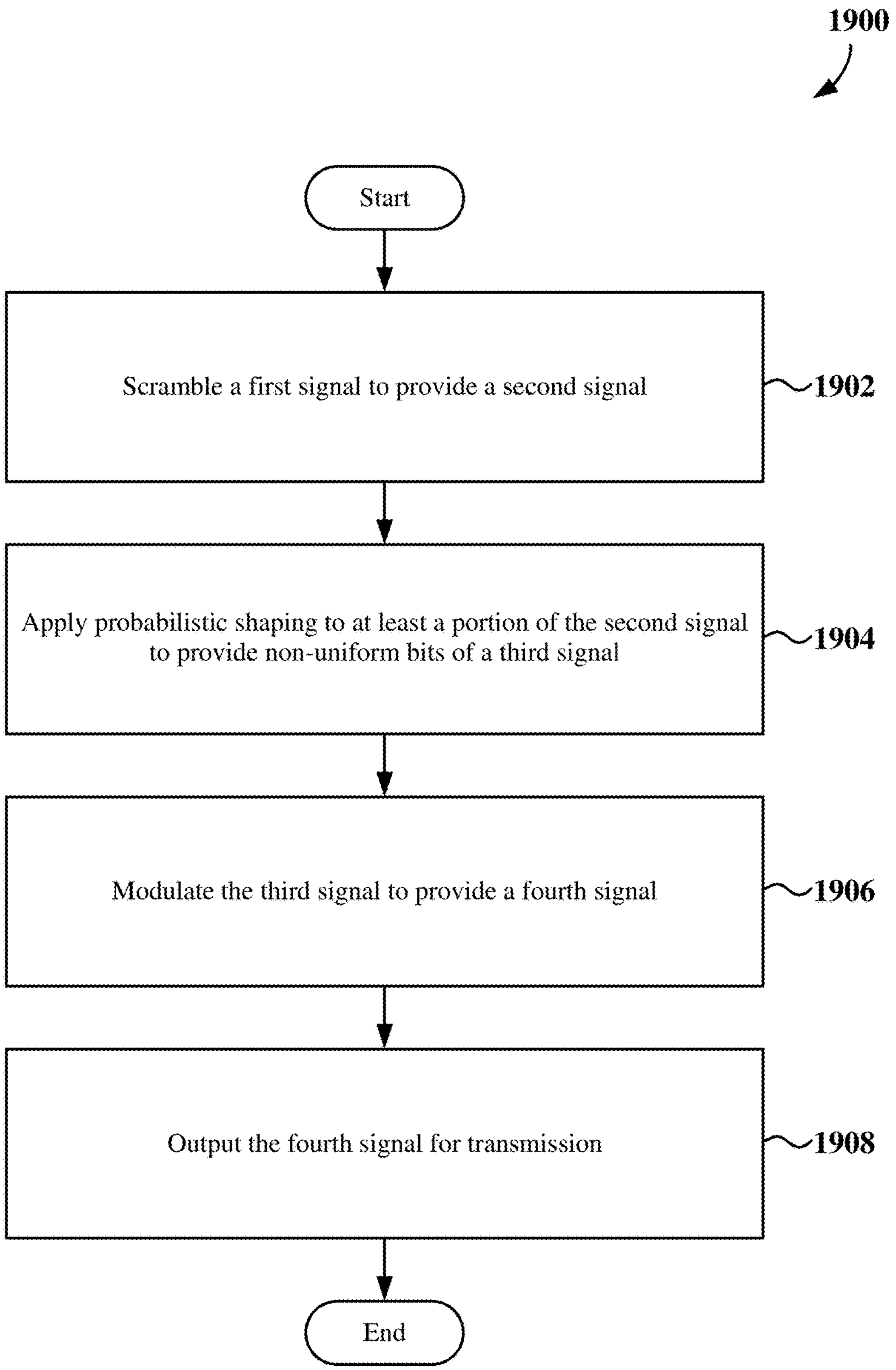
FIG. 19 is a flow chart illustrating an example scrambling and probabilistic shaping method according to some aspects.

FIG. 19 is a flow chart illustrating an example method 1900 for communication according to some aspects of the disclosure. As described herein, some or all illustrated features may be omitted in a particular implementation within the scope of the present disclosure, and some illustrated features may not be required for implementation of all examples. In some examples, the method 1900 may be carried out by the apparatus 1800 illustrated in FIG. 18. In some examples, the method 1900 may be carried out by the apparatus 500 or 502 illustrated in FIG. 5. In some examples, the method 1900 may be carried out by any suitable apparatus or means for carrying out the functions or algorithm described below.

At block 1902, an apparatus may scramble a first signal to provide a second signal. For example, the scrambling circuitry 1842 together with the communication and processing circuitry 1841 and the transceiver 1810, shown and described above in connection with FIG. 18, may provide a means to scramble a first signal to provide a second signal.

At block 1904, the apparatus may apply probabilistic shaping to at least a portion of the second signal to provide non-uniform bits of a third signal. For example, the probabilistic shaping circuitry 1843 together with the communication and processing circuitry 1841 and the transceiver 1810, shown and described above in connection with FIG. 18, may provide a means to apply probabilistic shaping to the second signal to provide non-uniform bits of a third signal.

At block 1906, the apparatus may modulate the third signal to provide a fourth signal. For example, the modulation circuitry 1844 together with the communication and processing circuitry 1841 and the transceiver 1810, shown and described above in connection with FIG. 18, may provide a means to modulate the third signal to provide a fourth signal.

At block 1908, the apparatus may output the fourth signal for transmission. For example, the communication and processing circuitry 1841 and the transceiver 1810, shown and described above in connection with FIG. 18, may provide a means to output the fourth signal for transmission.

In some examples, the third signal may include uniform bits. In some examples, the apparatus may apply channel coding to the non-uniform bits and the uniform bits of the third signal to provide an encoded third signal that includes shaped systematic bits, unshaped systematic bits, and parity bits. In some examples, to modulate the third signal to provide the fourth signal, the apparatus may map the shaped systematic bits of the encoded third signal to quadrature amplitude modulation (QAM) amplitudes to provide the fourth signal.

In some examples, the apparatus may scramble the unshaped systematic bits of the encoded third signal to provide a fifth signal, and scramble the parity bits of the encoded third signal to provide a sixth signal. In some examples, to modulate the third signal to provide the fourth signal, the apparatus may modulate the fifth signal and the sixth signal to provide the fourth signal. In some examples, to modulate the third signal to provide the fourth signal, the apparatus may map the fifth signal and the sixth signal to quadrature amplitude modulation (QAM) signs to provide the fourth signal.

In some examples, the apparatus may scramble the unshaped systematic bits and the parity bits of the encoded third signal to provide a fifth signal. In some examples, to modulate the third signal to provide the fourth signal, the apparatus may modulate the fifth signal to provide the fourth signal. In some examples, to modulate the third signal to provide the fourth signal, the apparatus may map the fifth signal to quadrature amplitude modulation (QAM) signs to provide the fourth signal.

In some examples, the apparatus may scramble the parity bits of the encoded third signal to provide a fifth signal. In some examples, to modulate the third signal to provide the fourth signal, the apparatus may modulate the fifth signal to provide the fourth signal. In some examples, to modulate the third signal to provide the fourth signal, the apparatus may map the fifth signal to quadrature amplitude modulation (QAM) signs to provide the fourth signal.

In some examples, the apparatus may demultiplex an input signal to provide the first signal. In some examples, the apparatus may demultiplex an input signal to provide the first signal and to provide uniform bits of the third signal. In some examples, the apparatus may apply channel coding to the uniform bits of the third signal and the non-uniform bits of the third signal to provide shaped systematic bits, unshaped systematic bits, and parity bits of the third signal. In some examples, the apparatus may scramble the unshaped systematic bits and the parity bits of the third signal to provide at least one fifth signal. In some examples, to modulate the third signal to provide the fourth signal, the apparatus may modulate the shaped systematic bits of the third signal and the at least one fifth signal to provide the fourth signal. In some examples, to modulate the third signal to provide the fourth signal, the apparatus may map the shaped systematic bits of the third signal to quadrature amplitude modulation (QAM) amplitudes, and map the at least one fifth signal to QAM signs.

In some examples, the apparatus may demultiplex the second signal to provide the at least a portion of the second signal. In some examples, the apparatus may demultiplex the second signal to provide the at least a portion of the second signal and to provide uniform bits of the third signal. In some examples, the apparatus may apply channel coding to the uniform bits of the third signal and the non-uniform bits of the third signal to provide shaped systematic bits, unshaped systematic bits, and parity bits of the third signal. In some examples, the apparatus may scramble the parity bits of the third signal to provide a fifth signal. In some examples, to modulate the third signal to provide the fourth signal, the apparatus may modulate the shaped systematic bits of the third signal, the unshaped systematic bits of the third signal, and the fifth signal to provide the fourth signal. In some examples, to modulate the third signal to provide the fourth signal, the apparatus may map the shaped systematic bits of the third signal to quadrature amplitude modulation (QAM) amplitudes, and map the fifth signal and the unshaped systematic bits of the third signal to QAM signs.

In some examples, the apparatus may apply a first scrambling scheme for an initial transmission of the fourth signal. In some examples, the apparatus may apply a second scrambling scheme for a retransmission of the initial transmission based on a redundancy vector of the retransmission or a received indication.

In some examples, the third signal may include shaped systematic bits for an initial transmission. In some examples, to modulate the third signal to provide the fourth signal, the apparatus may modulate the shaped systematic bits for the initial transmission. In some examples, the apparatus may scramble the shaped systematic bits to provide scrambled shaped systematic bits for a retransmission of the initial transmission. In some examples, to modulate the third signal to provide the fourth signal, the apparatus may modulate the scrambled shaped systematic bits for the retransmission of the initial transmission.

In one configuration, the apparatus 1800 includes means for scrambling a first signal to provide a second signal, means for applying probabilistic shaping to at least a portion of the second signal to provide non-uniform bits of a third signal, means for modulating the third signal to provide a fourth signal, and means for outputting the fourth signal for transmission. In one aspect, the aforementioned means may be the processor 1804 shown in FIG. 18 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1804 is merely provided as an example, and other means for carrying out the described functions may be included within various aspects of the present disclosure, including but not limited to the instructions stored in the computer-readable medium 1806, or any other suitable apparatus or means described in any one or more of FIGS. 1, 2, 4, 5, and 18, and utilizing, for example, the methods and/or algorithms described herein in relation to FIG. 19.

Figure 20:
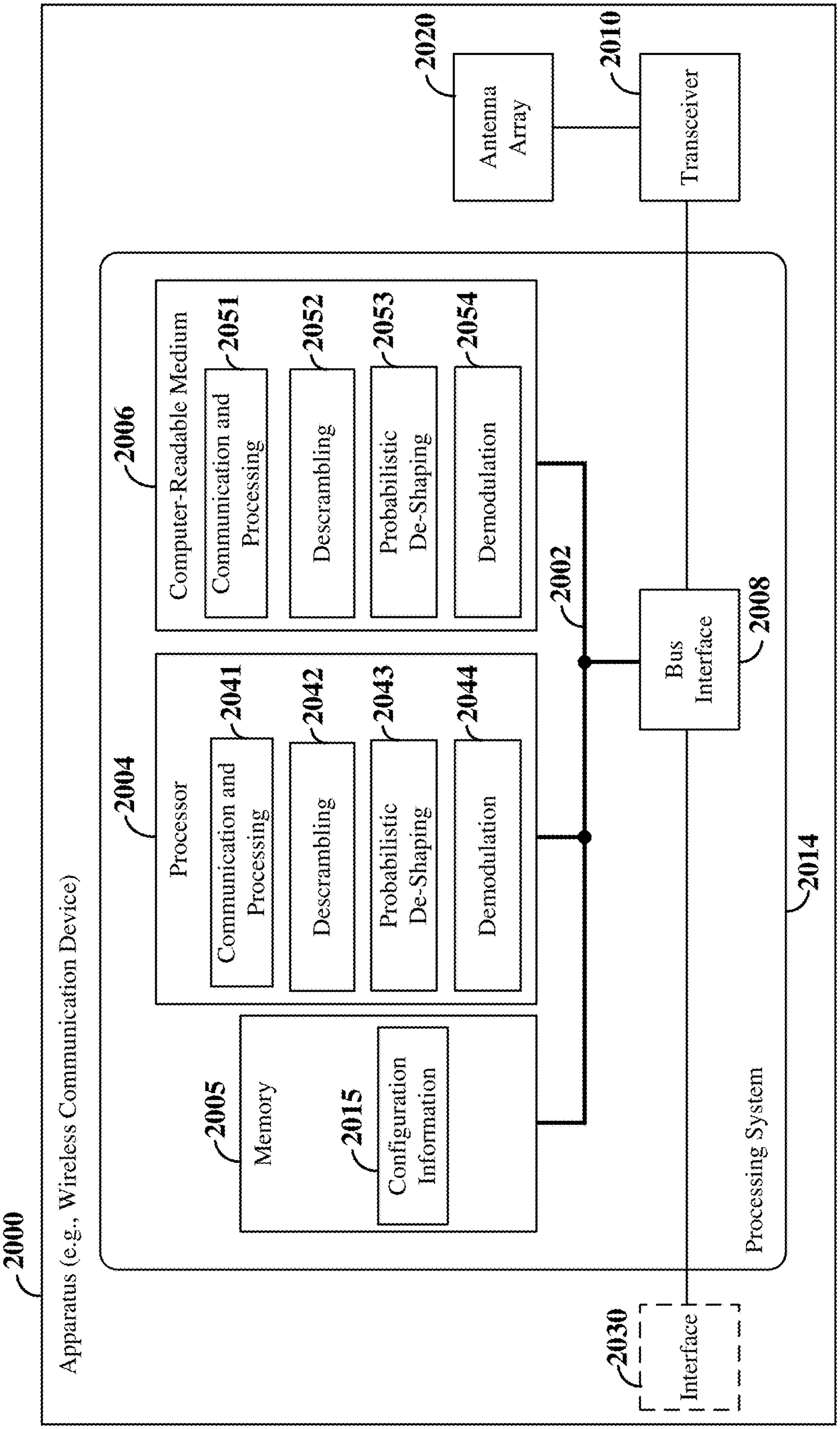
FIG. 20 is a block diagram illustrating an example of a hardware implementation for an apparatus (e.g., a wireless communication device) employing a processing system according to some aspects.

FIG. 20 is a block diagram illustrating an example of a hardware implementation for an apparatus 2000 employing a processing system 2014. In some implementations, the apparatus 2000 may correspond to any of the UEs, scheduled entities, base stations (e.g., gNBs), scheduling entities, distributed units, control units, RAN nodes, or CN entities shown in any of FIGS. 1, 2, 4, and 5. In some examples, the apparatus 2000 may include any of the transmit chains and/or receive chains shown in any of FIGS. 6-9, 12-15, and 17.

In accordance with various aspects of the disclosure, an element, or any portion of an element, or any combination of elements may be implemented with the processing system 2014. The processing system 2014 may include one or more processors 2004. Examples of processors 2004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 2000 may be configured to perform any one or more of the functions described herein. That is, the processor 2004, as utilized in the apparatus 2000, may be used to implement any one or more of the processes and procedures described herein.

In examples where the wireless communication device is a scheduled entity (e.g., a UE or a radio unit), the processor 2004 may in some instances be implemented via a baseband or modem chip and in other implementations, the processor 2004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In examples where the wireless communication device is a scheduling entity (e.g., a base station or a control unit), the processor 2004 may be configured to generate, schedule, and modify a resource assignment or grant of time-frequency resources (e.g., a set of one or more resource elements). For example, the processor 2004 may schedule time-frequency resources within a plurality of time division duplex (TDD) and/or frequency division duplex (FDD) subframes, slots, and/or mini-slots to carry user data traffic and/or control information to and/or from multiple UEs. The processor 2004 may further be configured to schedule resources for the transmission of an uplink signal. The processor 2004 may be configured to schedule uplink resources that may be utilized by the UE to transmit an uplink message (e.g., a PUCCH, a PUSCH, a PRACH occasion, or an RRC message). In some examples, the processor 2004 may be configured to schedule uplink resources in response to receiving a scheduling request from the UE.

In the example of FIG. 20, the processing system 2014 may be implemented with a bus architecture, represented generally by the bus 2002. The bus 2002 may include any number of interconnecting buses and bridges depending on the specific application of the processing system 2014 and the overall design constraints. The bus 2002 communicatively couples together various circuits including one or more processors (represented generally by the processor 2004), a memory 2005, and computer-readable media (represented generally by the computer-readable medium 2006). The bus 2002 may also link various other circuits such as timing sources, peripherals, voltage regulators, and power management circuits, which are well known in the art, and therefore, will not be described any further. A bus interface 2008 provides an interface between the bus 2002 and a transceiver 2010 and between the bus 2002 and an interface 2030. The transceiver 2010 provides a communication interface or means for communicating with various other apparatus over a wireless transmission medium. In some examples, the UE may include at least one transceiver 2010 and at least one antenna array 2020. A transceiver 2010 may include at least one transmitter circuit and/or at least one receiver circuit (e.g., as discussed above in conjunction with FIGS. 5-15). The interface 2030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 2030 may include a user interface (e.g., keypad, display, speaker, microphone, joystick). Of course, such a user interface is optional, and may be omitted in some examples, such as an IoT device.

The processor 2004 is responsible for managing the bus 2002 and general processing, including the execution of software stored on the computer-readable medium 2006. The software, when executed by the processor 2004, causes the processing system 2014 to perform the various functions described below for any particular apparatus. The computer-readable medium 2006 and the memory 2005 may also be used for storing data that is manipulated by the processor 2004 when executing software. For example, the memory 2005 may store configuration information 2015 (e.g., scrambling information and/or probabilistic shaping information) used by the processor 2004 in cooperation with the transceiver 2010 for transmitting and/or receiving signals.

One or more processors 2004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2006.

The computer-readable medium 2006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2006 may reside in the processing system 2014, external to the processing system 2014, or distributed across multiple entities including the processing system 2014. The computer-readable medium 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 2000 may be configured to perform any one or more of the operations described herein (e.g., as described above in conjunction with FIGS. 1-15 and as described below in conjunction with FIG. 21). In some aspects of the disclosure, the processor 2004, as utilized in the apparatus 2000, may include circuitry configured for various functions.

The processor 2004 may include communication and processing circuitry 2041. The communication and processing circuitry 2041 may be configured to communicate with another wireless communication device. The communication and processing circuitry 2041 may include one or more hardware components that provide the physical structure that performs various processes related to wireless communication (e.g., signal reception and/or signal transmission) as described herein. The communication and processing circuitry 2041 may further include one or more hardware components that provide the physical structure that performs various processes related to signal processing (e.g., processing a received signal and/or processing a signal for transmission) as described herein. In some examples, the communication and processing circuitry 2041 may include two or more transmit/receive chains. The communication and processing circuitry 2041 may further be configured to execute communication and processing software 2051 included on the computer-readable medium 2006 to implement one or more functions described herein.

The communication and processing circuitry 2041 may further be configured to control the antenna array 2020 and the transceiver 2010 to generate and transmit beamformed signals (e.g., at a mmWave frequency, etc.). Similarly, the communication and processing circuitry 2041 may further be configured to control the antenna array 2020 and the transceiver 2010 to receive and process beamformed signals.

In examples where the apparatus 2000 is a radio unit, the communication and processing circuitry 2041 may further be configured to communicate with a distributed unit via a first link (e.g., a fronthaul link) and a set of one or more child nodes (e.g., UEs) via respective second links (e.g., access links). In some examples, the communication and processing circuitry 2041 may further be configured to communicate with a child node via a fronthaul link.

In examples where the apparatus 2000 is a distributed unit, the communication and processing circuitry 2041 may be configured to communicate with a radio unit via a fronthaul link. In some implementations, the communication and processing circuitry 2041 may be configured to communicate with a parent node via one or more midhaul and/or backhaul links.

In some implementations where the communication involves obtaining (e.g., receiving) information, the communication and processing circuitry 2041 may obtain information from a component of the apparatus 2000 (e.g., from the transceiver 2010 that receives the information via radio frequency signaling or some other type of signaling suitable for the applicable communication medium), process (e.g., decode) the information, and output the processed information. For example, the communication and processing circuitry 2041 may output the information to another component of the processor 2004, to the memory 2005, or to the bus interface 2008. In some examples, the communication and processing circuitry 2041 may receive one or more of signals, messages, other information, or any combination thereof. In some examples, the communication and processing circuitry 2041 may receive information via one or more channels. In some examples, the communication and processing circuitry 2041 may include functionality for a means for receiving. In some examples, the communication and processing circuitry 2041 may include functionality for a means for obtaining (e.g., obtaining a signal from another device). In some examples, the communication and processing circuitry 2041 may include functionality for a means for receiving (e.g., receiving an RF signal). In some examples, the communication and processing circuitry 2041 may include functionality for a means for decoding.

In some implementations where the communication involves outputting (e.g., transmitting) information, the communication and processing circuitry 2041 may obtain information (e.g., from another component of the processor 2004, the memory 2005, or the bus interface 2008), process (e.g., encode) the information, and output the processed information. For example, the communication and processing circuitry 2041 may output the information to the transceiver 2010 (e.g., that transmits the information via radio frequency signaling or some other type of signaling suitable for the applicable communication medium). In some examples, the communication and processing circuitry 2041 may send one or more of signals, messages, other information, or any combination thereof. In some examples, the communication and processing circuitry 2041 may send information via one or more channels. In some examples, the communication and processing circuitry 2041 may include functionality for a means for sending (e.g., a means for transmitting). In some examples, the communication and processing circuitry 2041 may include functionality for a means for outputting (e.g., outputting a signal to another device). In some examples, the communication and processing circuitry 2041 may include functionality for a means for transmitting (e.g., transmitting an RF signal). In some examples, the communication and processing circuitry 2041 may include functionality for a means for encoding.

In some examples, the communication and processing circuitry 2041 may include functionality for a means for decoding a signal (e.g., means for performing error correction). For example, the communication and processing circuitry 2041 may be configured to perform the operations of the decoding 1504 of FIG. 15.

In some examples, the communication and processing circuitry 2041 may include functionality for a means for multiplexing a signal. For example, the communication and processing circuitry 2041 may be configured to perform the operations of the multiplexer 1530 of FIG. 15.

The processor 2004 may include descrambling circuitry 2042 configured to perform descrambling-related operations as discussed herein (e.g., one or more of the operations described in conjunction with FIGS. 8-15). The descrambling circuitry 2042 may be configured to execute descrambling software 2052 included on the computer-readable medium 2006 to implement one or more functions described herein.

The descrambling circuitry 2042 may include functionality for a means for descrambling a signal. For example, the descrambling circuitry 2042 may be configured to apply an inverse of a pseudo-random sequence (e.g., based on a seed associated with the apparatus 2000 or another apparatus) to a received signal. In some examples, the descrambling circuitry 2042 may be configured to perform the operations of the descrambler 1520, 1522, 1528, 1532 of FIG. 15.

The processor 2004 may include probabilistic de-shaping circuitry 2043 configured to perform probabilistic de-shaping-related operations as discussed herein (e.g., one or more of the operations described in conjunction with FIGS. 8-15). The probabilistic de-shaping circuitry 2043 may be configured to execute probabilistic de-shaping software 2053 included on the computer-readable medium 2006 to implement one or more functions described herein.

The probabilistic de-shaping circuitry 2043 may include functionality for a means for applying probabilistic de-shaping to a signal. For example, the probabilistic de-shaping circuitry 2043 may be configured to apply probabilistic amplitude de-shaping to a demodulated signal (e.g., recovered shaped systematic bits). In some examples, the probabilistic de-shaping circuitry 2043 maps a bit sequence with a non-uniform distribution (e.g., a Gaussian distribution) to a bit sequence with a uniform distribution. In some examples, the probabilistic de-shaping circuitry 2043 may be configured to perform the operations of the probabilistic de-shaping 1506 of FIG. 15

The processor 2004 may include demodulation circuitry 2044 configured to perform demodulation-related operations as discussed herein (e.g., one or more of the operations described in conjunction with FIGS. 8-15). The demodulation circuitry 2044 may be configured to execute demodulation software 2054 included on the computer-readable medium 2006 to implement one or more functions described herein.

The demodulation circuitry 2044 may include functionality for a means for demodulating a signal. For example, the demodulation circuitry 2044 may be configured to demodulate a received QAM signal to recover shaped systematic bits, unshaped systematic bits, and parity bits. In some examples, the demodulation circuitry 2044 may be configured to perform the operations of the QAM demodulation 1502 of FIG. 15.

Figure 21:
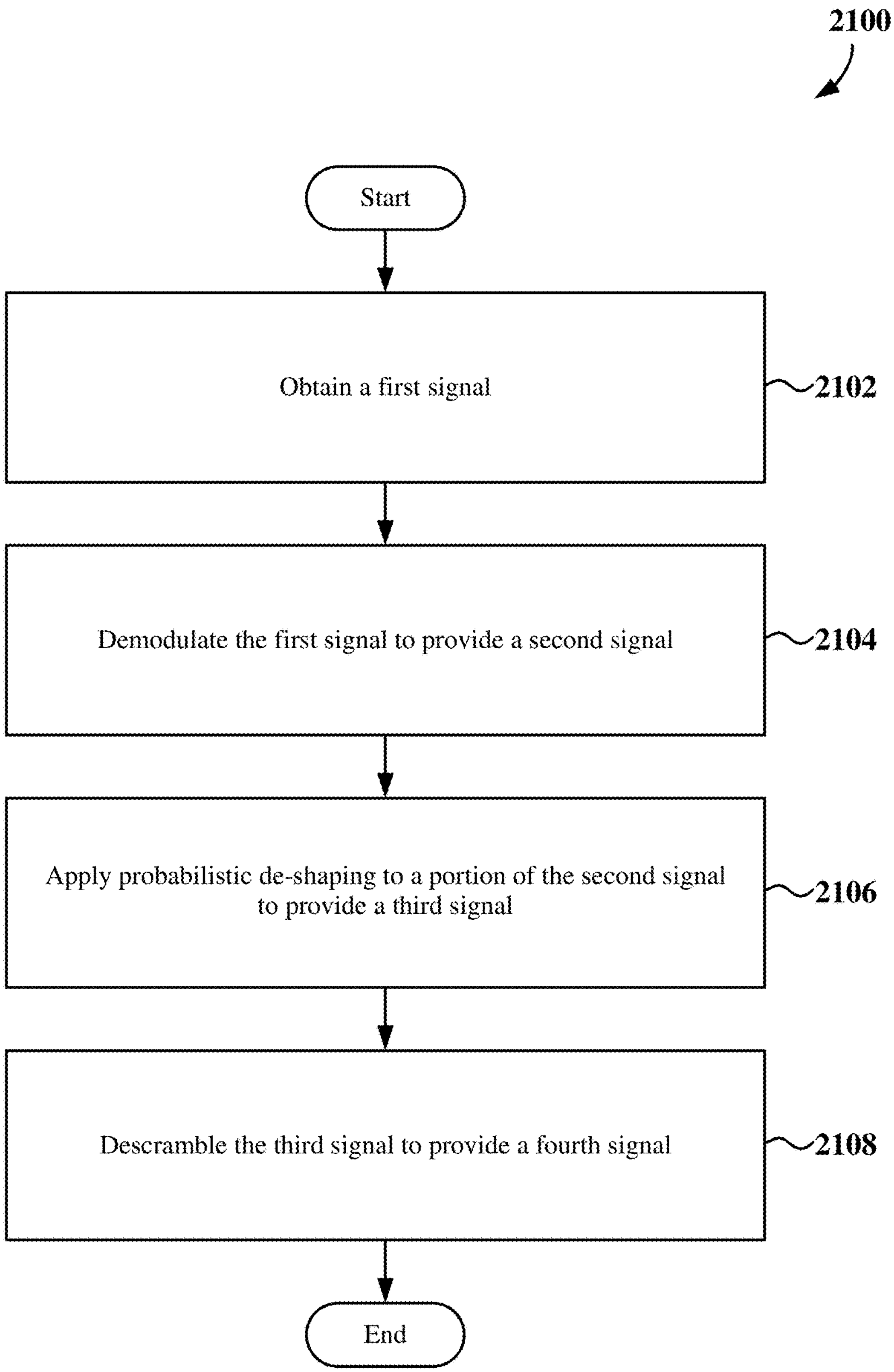
FIG. 21 is a flow chart illustrating an example descrambling and probabilistic de-shaping method according to some aspects.

FIG. 21 is a flow chart illustrating an example method 2100 for communication according to some aspects of the disclosure. As described herein, some or all illustrated features may be omitted in a particular implementation within the scope of the present disclosure, and some illustrated features may not be required for implementation of all examples. In some examples, the method 2100 may be carried out by the apparatus 2000 illustrated in FIG. 20. In some examples, the method 2100 may be carried out by the apparatus 500 or 502 illustrated in FIG. 5. In some examples, the method 2100 may be carried out by any suitable apparatus or means for carrying out the functions or algorithm described below.

At block 2102, the apparatus may obtain a first signal. For example, the communication and processing circuitry 2041 and the transceiver 2010, shown and described above in connection with FIG. 20, may provide a means to obtain a first signal.

At block 2104, the apparatus may demodulate the first signal to provide a second signal. For example, the demodulation circuitry 2044 together with the communication and processing circuitry 2041 and the transceiver 2010, shown and described above in connection with FIG. 20, may provide a means to demodulate the first signal to provide a second signal.

At block 2106, the apparatus may apply probabilistic de-shaping to a portion of the second signal to provide a third signal. For example, the probabilistic de-shaping circuitry 2043 together with the communication and processing circuitry 2041 and the transceiver 2010, shown and described above in connection with FIG. 20, may provide a means to apply probabilistic de-shaping to the second signal to provide a third signal.

At block 2108, an apparatus may descramble the third signal to provide a fourth signal. For example, the descrambling circuitry 2042 together with the communication and processing circuitry 2041 and the transceiver 2010, shown and described above in connection with FIG. 20, may provide a means to descramble the third signal to provide a fourth signal.

In some examples, the second signal may include shaped systematic bits, unshaped systematic bits, and parity bits. In some examples, the shaped systematic bits are mapped to quadrature amplitude modulation (QAM) amplitudes. In some examples, the unshaped systematic bits are mapped to quadrature amplitude modulation (QAM) signs. In some examples, the parity bits are mapped to quadrature amplitude modulation (QAM) signs.

In some examples, the apparatus may descramble the unshaped systematic bits and the parity bits to provide a fifth signal, and perform error correction based on the shaped systematic bits and the fifth signal. In some examples, the apparatus may descramble the unshaped systematic bits to provide a fifth signal, descramble the parity bits to provide a sixth signal, and perform error correction based on the shaped systematic bits, the fifth signal, and the sixth signal. In some examples, the apparatus may descramble the parity bits to provide a fifth signal, and perform error correction based on the shaped systematic bits, the unshaped systematic bits, and the fifth signal.

In some examples, to apply probabilistic de-shaping to the second signal to provide the third signal, the apparatus may apply probabilistic de-shaping to non-uniform bits of the second signal. In some examples, the apparatus may multiplex the third signal with uniform bits of the second signal. In some examples, the apparatus may multiplex the third signal with uniform bits of the second signal to provide a multiplexed signal. In some examples, to descramble the third signal to provide the fourth signal, the apparatus may descramble the multiplexed signal.

In one configuration, the apparatus 2000 includes means for obtaining a first signal via the interface, means for demodulating the first signal to provide a second signal, means for applying probabilistic de-shaping to the second signal to provide a third signal, and means for descrambling the third signal to provide a fourth signal. In one aspect, the aforementioned means may be the processor 2004 shown in FIG. 20 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable medium 2006, or any other suitable apparatus or means described in any one or more of FIGS. 1, 2, 4, 5, and 20, and utilizing, for example, the methods and/or algorithms described herein in relation to FIG. 21.

The methods shown in FIGS. 19 and 21 may include additional aspects, such as any single aspect or any combination of aspects described below and/or in connection with one or more other processes described elsewhere herein. The following provides an overview of several aspects of the present disclosure.

Aspect 1: A method for communication at an apparatus, the method comprising: scrambling a first signal to provide a second signal; applying probabilistic shaping to at least a portion of the second signal to provide non-uniform bits of a third signal; modulating the third signal to provide a fourth signal; and outputting the fourth signal for transmission.

Aspect 2: The method of aspect 1, wherein the third signal further comprises uniform bits.

Aspect 3: The method of aspect 2, further comprising: applying channel coding to the non-uniform bits and the uniform bits of the third signal to provide an encoded third signal comprising shaped systematic bits, unshaped systematic bits, and parity bits.

Aspect 4: The method of aspect 3, wherein the modulation of the third signal to provide the fourth signal comprises: mapping the shaped systematic bits of the encoded third signal to quadrature amplitude modulation (QAM) amplitudes to provide the fourth signal.

Aspect 5: The method of any of aspects 3 through 4, wherein: the method further comprises scrambling the unshaped systematic bits of the encoded third signal to provide a fifth signal; the method further comprises scrambling the parity bits of the encoded third signal to provide a sixth signal; and the modulation of the third signal to provide the fourth signal further comprises modulating the fifth signal and the sixth signal to provide the fourth signal.

Aspect 6: The method of aspect 5, wherein the modulation of the third signal to provide the fourth signal comprises: mapping the fifth signal and the sixth signal to quadrature amplitude modulation (QAM) signs to provide the fourth signal.

Aspect 7: The method of aspect 3, wherein: the method further comprises scrambling the unshaped systematic bits and the parity bits of the encoded third signal to provide a fifth signal; and the modulation of the third signal to provide the fourth signal comprises modulating the fifth signal to provide the fourth signal.

Aspect 8: The method of aspect 7, wherein the modulation of the third signal to provide the fourth signal comprises: mapping the fifth signal to quadrature amplitude modulation (QAM) signs to provide the fourth signal.

Aspect 9: The method of aspect 3, wherein: the method further comprises scrambling the parity bits of the encoded third signal to provide a fifth signal; and the modulation of the third signal to provide the fourth signal comprises modulating the fifth signal to provide the fourth signal.

Aspect 10: The method of aspect 9, wherein the modulation of the third signal to provide the fourth signal comprises: mapping the fifth signal to quadrature amplitude modulation (QAM) signs to provide the fourth signal.

Aspect 11: The method of any of aspects 1 through 10, further comprising: demultiplexing an input signal to provide the first signal.

Aspect 12: The method of any of aspects 1 through 10, further comprising: demultiplexing the second signal to provide the at least a portion of the second signal.

Aspect 13: The method of any of aspects 1 through 3, wherein: the method further comprises demultiplexing an input signal to provide the first signal and to provide uniform bits of the third signal; the method further comprises applying channel coding to the uniform bits of the third signal and the non-uniform bits of the third signal to provide shaped systematic bits, unshaped systematic bits, and parity bits of the third signal; the method further comprises scrambling the unshaped systematic bits and the parity bits of the third signal to provide at least one fifth signal; and the modulation of the third signal to provide the fourth signal comprises modulating the shaped systematic bits of the third signal and the at least one fifth signal to provide the fourth signal.

Aspect 14: The method of aspect 13, wherein the modulation of the third signal to provide the fourth signal comprises: mapping the shaped systematic bits of the third signal to quadrature amplitude modulation (QAM) amplitudes; and mapping the at least one fifth signal to QAM signs.

Aspect 15: The method of any of aspects 1 through 3, wherein: the method further comprises demultiplexing the second signal to provide the at least a portion of the second signal and to provide uniform bits of the third signal; the method further comprises applying channel coding to the uniform bits of the third signal and the non-uniform bits of the third signal to provide shaped systematic bits, unshaped systematic bits, and parity bits of the third signal; the method further comprises scrambling the parity bits of the third signal to provide a fifth signal; and the modulation of the third signal to provide the fourth signal comprises modulating the shaped systematic bits of the third signal, the unshaped systematic bits of the third signal, and the fifth signal to provide the fourth signal.

Aspect 16: The method of aspect 15, wherein the modulation of the third signal to provide the fourth signal comprises: mapping the shaped systematic bits of the third signal to quadrature amplitude modulation (QAM) amplitudes; and mapping the fifth signal and the unshaped systematic bits of the third signal to QAM signs.

Aspect 17: The method of any of aspects 1 through 16, further comprising: applying a first scrambling scheme for an initial transmission of the fourth signal; and applying a second scrambling scheme for a retransmission of the initial transmission based on a redundancy vector of the retransmission or based on a received indication.

Aspect 18: The method of any of aspects 1 through 16, wherein: the third signal comprises shaped systematic bits for an initial transmission; the modulation of the third signal to provide the fourth signal comprises modulating the shaped systematic bits for the initial transmission; the method further comprises scrambling the shaped systematic bits to provide scrambled shaped systematic bits for a retransmission of the initial transmission; and the method further comprises modulating the scrambled shaped systematic bits for the retransmission of the initial transmission.

Aspect 19: The method of any of aspects 1 through 18, further comprising: transmitting the fourth signal, wherein the apparatus is configured as a user equipment or a base station.

Aspect 20: A method for communication at an apparatus, the method comprising: obtaining a first signal; demodulating the first signal to provide a second signal; applying probabilistic de-shaping to a portion of the second signal to provide a third signal; and descrambling the third signal to provide a fourth signal.

Aspect 21: The method of aspect 20, wherein the second signal comprises shaped systematic bits, unshaped systematic bits, and parity bits.

Aspect 22: The method of aspect 21, wherein the shaped systematic bits are mapped to quadrature amplitude modulation (QAM) amplitudes.

Aspect 23: The method of any of aspects 21 through 22, wherein the unshaped systematic bits are mapped to quadrature amplitude modulation (QAM) signs.

Aspect 24: The method of any of aspects 21 through 23, wherein the parity bits are mapped to quadrature amplitude modulation (QAM) signs.

Aspect 25: The method of any of aspects 21 through 24, further comprising: descrambling the unshaped systematic bits and the parity bits to provide a fifth signal; and performing error correction based on the shaped systematic bits and the fifth signal.

Aspect 26: The method of any of aspects 21 through 24, further comprising: descrambling the unshaped systematic bits to provide a fifth signal; descrambling the parity bits to provide a sixth signal; and performing error correction based on the shaped systematic bits, the fifth signal, and the sixth signal.

Aspect 27: The method of any of aspects 21 through 24, further comprising: descrambling the parity bits to provide a fifth signal; and performing error correction based on the shaped systematic bits, the unshaped systematic bits, and the fifth signal.

Aspect 28: The method of any of aspects 20 through 27, wherein the application of the probabilistic de-shaping to the portion of the second signal to provide the third signal comprises: applying probabilistic de-shaping to non-uniform bits of the second signal.

Aspect 29: The method of aspect 28, further comprising: multiplexing the third signal with uniform bits of the second signal.

Aspect 30: The method of any of aspects 20 through 29, further comprising: receiving the first signal, wherein the apparatus is configured as a user equipment or a base station.

Aspect 31: A wireless node, comprising: at least one transceiver; a memory comprising instructions; and one or more processors configured to execute the instructions and cause the wireless node to perform a method in accordance with any one or more of aspects 1-18, wherein the at least one transceiver is configured to transmit the fourth signal.

Aspect 32: An apparatus configured for communication comprising at least one means for performing any one or more of aspects 1 through 19.

Aspect 33: A non-transitory computer-readable medium storing computer-executable code, comprising code for causing an apparatus to perform any one or more of aspects 1 through 19.

Aspect 34: A wireless node, comprising: at least one transceiver; a memory comprising instructions; and one or more processors configured to execute the instructions and cause the wireless device to perform a method in accordance with any one or more of aspects 20-29, wherein the at least one transceiver is configured to receive the first signal.

Aspect 35: An apparatus configured for communication comprising at least one means for performing any one or more of aspects 20 through 30.

Aspect 36: A non-transitory computer-readable medium storing computer-executable code, comprising code for causing an apparatus to perform any one or more of aspects 20 through 30.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1, 2, 4, 5, 18, and 20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for communication, comprising:
at least one transceiver; and
a processing system configured to cause the apparatus to:
scramble a first signal to provide a second signal,
demultiplex the second signal to provide the at least one signal portion associated with the second signal;
apply probabilistic shaping to the at least one signal portion associated with the second signal to provide non-uniform bits of a third signal,
modulate the third signal to provide a fourth signal, and
transmit, via the at least one transceiver, the fourth signal.

2. The apparatus of claim 1, wherein the third signal further comprises uniform bits.

3. The apparatus of claim 2, wherein the processing system is further configured to cause the apparatus to:
apply channel coding to the non-uniform bits and the uniform bits of the third signal to provide an encoded third signal comprising shaped systematic bits, unshaped systematic bits, and parity bits.

4. The apparatus of claim 3, wherein the modulation of the third signal to provide the fourth signal comprises:
mapping the shaped systematic bits of the encoded third signal to quadrature amplitude modulation (QAM) amplitudes to provide the fourth signal.

5. The apparatus of claim 3, wherein:
the processing system is further configured to cause the apparatus to scramble the unshaped systematic bits of the encoded third signal to provide a fifth signal;
the processing system is further configured to cause the apparatus to scramble the parity bits of the encoded third signal to provide a sixth signal; and
the modulation of the third signal to cause the apparatus to provide the fourth signal further comprises modulating the fifth signal and the sixth signal to provide the fourth signal.

6. The apparatus of claim 5, wherein the modulation of the third signal to provide the fourth signal comprises:
mapping the fifth signal and the sixth signal to quadrature amplitude modulation (QAM) signs to provide the fourth signal.

7. The apparatus of claim 3, wherein:
the processing system is further configured to cause the apparatus to scramble the unshaped systematic bits and the parity bits of the encoded third signal to provide a fifth signal; and the modulation of the third signal to provide the fourth signal comprises modulating the fifth signal to provide the fourth signal.

8. The apparatus of claim 7, wherein the modulation of the third signal to provide the fourth signal comprises:

mapping the fifth signal to quadrature amplitude modulation (QAM) signs to provide the fourth signal.

9. The apparatus of claim 3, wherein:

the processing system is further configured to cause the apparatus to scramble the parity bits of the encoded third signal to provide a fifth signal; and the modulation of the third signal to provide the fourth signal comprises modulating the fifth signal to provide the fourth signal.

10. The apparatus of claim 9, wherein the modulation of the third signal to provide the fourth signal comprises:

mapping the fifth signal to quadrature amplitude modulation (QAM) signs to provide the fourth signal.

11. The apparatus of claim 1, wherein the processing system is further configured to cause the apparatus to:

demultiplex an input signal to provide the first signal.

12. The apparatus of claim 1, wherein:

the processing system is further configured to cause the apparatus to demultiplex an input signal to provide the first signal and to provide uniform bits of the third signal;

the processing system is further configured to cause the apparatus to apply channel coding to the uniform bits of the third signal and the non-uniform bits of the third signal to provide shaped systematic bits, unshaped systematic bits, and parity bits of the third signal;

the processing system is further configured to cause the apparatus to scramble the unshaped systematic bits and the parity bits of the third signal to provide at least one fifth signal; and the modulation of the third signal to provide the fourth signal comprises modulating the shaped systematic bits of the third signal and the at least one fifth signal to provide the fourth signal.

13. The apparatus of claim 12, wherein the modulation of the third signal to provide the fourth signal comprises:

mapping the shaped systematic bits of the third signal to quadrature amplitude modulation (QAM) amplitudes; and mapping the at least one fifth signal to QAM signs.

14. The apparatus of claim 1, wherein:

the processing system is further configured to demultiplex the second signal to provide the at least a portion of the second signal and to provide uniform bits of the third signal;

the processing system is further configured to cause the apparatus to apply channel coding to the uniform bits of the third signal and the non-uniform bits of the third signal to provide shaped systematic bits, unshaped systematic bits, and parity bits of the third signal;

the processing system is further configured to cause the apparatus to to scramble the parity bits of the third signal to provide a fifth signal; and the modulation of the third signal to provide the fourth signal comprises modulating the shaped systematic bits of the third signal, the unshaped systematic bits of the third signal, and the fifth signal to provide the fourth signal.

15. The apparatus of claim 1, wherein the processing system is further configured to cause the apparatus to:

apply a first scrambling scheme for an initial transmission of the fourth signal; and apply a second scrambling scheme for a retransmission of the initial transmission based on a redundancy vector of the retransmission or based on a received indication.

16. The apparatus of claim 1, wherein:

the third signal comprises shaped systematic bits for an initial transmission;

the modulation of the third signal to provide the fourth signal comprises modulating the shaped systematic bits for the initial transmission;

the processing system is further configured to cause the apparatus to scramble the shaped systematic bits to provide scrambled shaped systematic bits for a retransmission of the initial transmission; and the processing system is further configured to cause the apparatus to modulate the scrambled shaped systematic bits for the retransmission of the initial transmission.

17. The apparatus of claim 1, wherein the apparatus is configured to operate as a user equipment or a base station.

18. A method for communication by a user equipment, the method comprising:

scrambling a first signal to provide a second signal;

demultiplexing the second signal to provide the at least one signal portion associated with the second signal;

applying probabilistic to the at least one signal portion associated with the second signal to provide non-uniform bits of a third signal;

modulating the third signal to provide a fourth signal; and transmitting the fourth signal.

19. An apparatus for communication, comprising:

an interface; and a processing system configured to:

obtain a first signal via the interface, demodulate the first signal to provide a second signal, apply probabilistic de-shaping to a portion of the second signal to provide a de-shaped signal portion and then multiplex the de-shaped signal portion to provide a third signal, and descramble the third signal to provide a fourth signal.

20. The apparatus of claim 19, wherein the second signal comprises shaped systematic bits, unshaped systematic bits, and parity bits.

21. The apparatus of claim 20, wherein the shaped systematic bits are mapped to quadrature amplitude modulation (QAM) amplitudes.

22. The apparatus of claim 20, wherein the unshaped systematic bits are mapped to quadrature amplitude modulation (QAM) signs.

23. The apparatus of claim 20, wherein the parity bits are mapped to quadrature amplitude modulation (QAM) signs.

24. The apparatus of claim 20, wherein the processing system is further configured to cause the apparatus to:

descramble the unshaped systematic bits and the parity bits to provide a fifth signal; and perform error correction based on the shaped systematic bits and the fifth signal.

25. The apparatus of claim 20, wherein the processing system is further configured to cause the apparatus to:

descramble the unshaped systematic bits to provide a fifth signal;

descramble the parity bits to provide a sixth signal; and perform error correction based on the shaped systematic bits, the fifth signal, and the sixth signal.

26. The apparatus of claim 20, wherein the processing system is further configured to cause the apparatus to:

descramble the parity bits to provide a fifth signal; and perform error correction based on the shaped systematic bits, the unshaped systematic bits, and the fifth signal.

27. The apparatus of claim 19, wherein the application of the probabilistic de-shaping to the portion of the second signal to provide the third signal comprises:

applying probabilistic de-shaping to non-uniform bits of the second signal.

28. The apparatus of claim 27, wherein the processing system is further configured to cause the apparatus to:

multiplex the third signal with uniform bits of the second signal.

29. The apparatus of claim 19, wherein the apparatus is configured to operate as a user equipment or a base station.

* * * * *